United States Patent
Lee et al.

(10) Patent No.: US 11,074,909 B2
(45) Date of Patent: Jul. 27, 2021

(54) DEVICE FOR RECOGNIZING SPEECH INPUT FROM USER AND OPERATING METHOD THEREOF

(71) Applicant: SAMSUNG ELECTRONICS CO., LTD., Suwon-si (KR)

(72) Inventors: Kyungmin Lee, Suwon-si (KR); Youngho Han, Suwon-si (KR); Sangyoon Kim, Suwon-si (KR); Donguk Jung, Suwon-si (KR); Aahwan Kudumula, Suwon-si (KR); Changwoo Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/913,339

(22) Filed: Jun. 26, 2020

(65) Prior Publication Data

US 2020/0410992 A1   Dec. 31, 2020

Related U.S. Application Data

(60) Provisional application No. 62/868,028, filed on Jun. 28, 2019.

(30) Foreign Application Priority Data

Jun. 9, 2020   (KR) .................. 10-2020-0069846

(51) Int. Cl.
| | | |
|---|---|---|
| *G10L 15/197* | (2013.01) | |
| *G10L 15/04* | (2013.01) | |
| *G10L 15/26* | (2006.01) | |

(52) U.S. Cl.
CPC ............ *G10L 15/197* (2013.01); *G10L 15/04* (2013.01); *G10L 15/26* (2013.01)

(58) Field of Classification Search
None
See application file for complete search history.

(56) References Cited

U.S. PATENT DOCUMENTS

| 9,037,463 B2 | 5/2015 | Willett et al. |
| 9,916,827 B2 | 3/2018 | Ahn et al. |
| (Continued) | | |

FOREIGN PATENT DOCUMENTS

| CN | 105814628 A | 7/2016 |
| CN | 106409284 A | 2/2017 |
| (Continued) | | |

OTHER PUBLICATIONS

US 10,665,224 B2, 05/2020, Park et al. (withdrawn)
(Continued)

*Primary Examiner* — Antim G Shah
(74) *Attorney, Agent, or Firm* — Sughrue Mion, PLLC

(57) ABSTRACT

Provided are a device for recognizing a speech input including a named entity from a user and an operating method thereof. The device is configured to: generate a weighted finite state transducer model by using a vocabulary list including a plurality of named entities; obtain a first string from a speech input received from a user, by using a first decoding model; obtain a second string by using a second decoding model that uses the weighted finite state transducer model, the second string including a word sequence, which corresponds to at least one named entity, and an unrecognized word sequence not identified as a named entity; and output a text corresponding to the speech input by substituting the unrecognized word sequence of the second string with a word sequence included in the first string.

20 Claims, 12 Drawing Sheets

(56) References Cited

U.S. PATENT DOCUMENTS

| | | | |
|---|---|---|---|
| 10,354,652 B2 | 7/2019 | Huang et al. | |
| 10,497,363 B2 | 12/2019 | Ahn et al. | |
| 10,943,583 B1* | 3/2021 | Gandhe | G10L 25/27 |
| 2015/0088511 A1* | 3/2015 | Bharadwaj | G10L 15/183 |
| | | | 704/244 |
| 2016/0232894 A1 | 8/2016 | Park et al. | |
| 2017/0032779 A1* | 2/2017 | Ahn | G10L 15/063 |
| 2017/0154033 A1 | 6/2017 | Lee | |
| 2018/0121796 A1 | 5/2018 | Deisher et al. | |
| 2018/0374484 A1 | 12/2018 | Huang et al. | |
| 2019/0057685 A1 | 2/2019 | Yu et al. | |
| 2019/0139540 A1 | 5/2019 | Kanda | |
| 2020/0058294 A1 | 2/2020 | Ahn et al. | |

FOREIGN PATENT DOCUMENTS

| | | |
|---|---|---|
| EP | 3 125 236 A1 | 2/2017 |
| EP | 3 557 573 A1 | 10/2019 |
| IN | 201627011312 | 7/2016 |
| IN | 319869 | 9/2019 |
| KR | 10-2017-0106951 A | 9/2017 |
| KR | 10-2019-0032868 A | 3/2019 |

OTHER PUBLICATIONS

International Search Report and Written Opinion (PCT/ISA/210 and PCT/ISA/237), dated Sep. 25, 2020 by International Searching Authority in International Application No. PCT/KR2020/008396.

* cited by examiner

DEVICE FOR RECOGNIZING SPEECH INPUT FROM USER AND OPERATING METHOD THEREOF

CROSS-REFERENCE TO RELATED APPLICATIONS

This application is based on and claims priority under 35 U.S.C. § 119 to U.S. Provisional Application No. 62/868,028, filed on Jun. 28, 2019, in the U.S. Patent and Trademark Office, and Korean Patent Application No. 10-2020-0069846, filed on Jun. 9, 2020, in the Korean Intellectual Property Office, the disclosures of which are incorporated by reference herein in their entireties.

BACKGROUND

1. Field

The disclosure relates to a device for recognizing, by using an artificial intelligence model, a speech input received from a user, and an operating method of the device.

2. Description of Related Art

Speech recognition functions are functions of easily controlling devices by recognizing speech inputs from users without separate control of buttons or contact with touch modules. Recently, speech recognition functions have been combined with artificial intelligence (AI) technology along with the development of the AI technology, and thus, various speeches have been able to be quickly and accurately recognized.

According to a method of recognizing a speech input from a user by using the AI technology, a speech signal, which is an analog signal, may be received through a microphone, and a speech component may be converted into computer-readable text by using an automatic speech recognition (ASR) model. The ASR model may be an AI model. An AI model may be processed by an AI-dedicated processor designed in a hardware structure specialized for processing the AI model. An AI model may be made through training. Here, the expression "made through training" means that an existing AI model is trained based on a learning algorithm by using a large number of pieces of training data and thus made into a predefined operation rule or an AI model, which is set to fulfill an intended feature (or purpose). An AI model may include a plurality of neural network layers. Each of the neural network layer has a plurality of weight values and performs a neural network operation through an operation between an operation result of a previous layer and the plurality of weight values.

An AI model for using a speech recognition function is generated through training, and in particular, because named entities need to be learned using numerous pattern sentences such as sentences combined with the named entities, a large amount of data calculation is needed and the training takes a lot of time. In particular, on-device speech recognition functions, in which speech recognition such as ASR is performed by devices, have been recently used, and because the amount of data calculation is too large to perform training regarding pattern sentences including named entities in an on-device environment, a lot of time is required. In addition, because all pattern sentences combining named entities, command statements related to the named entities, and the like need to be learned upon learning pattern sentences regarding named entities in on-device environments, there is an issue in that speech recognition according to AI models generated on device sides exhibit deteriorated accuracy.

SUMMARY

Provided are a speech recognition method and a speech recognition device for improving recognition accuracy of a speech input including a named entity even without learning about pattern sentences.

Additional aspects will be set forth in part in the description which follows and, in part, will be apparent from the description, or may be learned by practice of the presented embodiments.

In accordance with an aspect of the disclosure, there is provided a method of performing speech recognition by a device, including: by using a vocabulary list comprising a plurality of named entities, generating a weighted finite state transducer model by performing training regarding a probability that a subword extracted from each of the plurality of named entities is predictable as a word or word sequence representing a named entity, receiving a speech input from a user; by using a first artificial intelligence (AI) decoding model, obtaining a feature vector indicating a probability of predicting a subword from the received speech input, and obtaining a first string comprising a plurality of predicted strings based on the feature vector; inputting the feature vector to a second AI decoding model that uses a weighted finite state transducer model that is trained to predict a training word or training word sequence representing a named entity, from a training subword extracted from a plurality of named training entities; by using the second AI decoding model, obtaining a second string based on the feature vector, the second string comprising a recognized word sequence that corresponds to at least one of a plurality of predetermined named entities, and an unrecognized word sequence that does not correspond to any one of the plurality of predetermined named entities; and outputting a text corresponding to the received speech input by substituting the unrecognized word sequence of the second string with a word sequence included in the first string.

The generating the weighted finite state transducer model comprises generating the weighted finite state transducer model by: obtaining a vocabulary list including the plurality of named entities; segmenting a training word or a training string constituting the plurality of named entities into training subwords that are in units of phonemes or syllables; and obtaining a confidence score including a posterior probability of predicting one of the plurality of named entities from the training subwords, through state transition using frequencies of the training subwords and arrangement orders of the training subwords.

The generating the weighted finite state transducer model further comprises performing filtering to remove the named entity, from the plurality of named entities, based the named entity overlapping with a word pre-stored in a memory of the device.

The weighted finite state transducer model may include a lexicon finite state transducer and a grammar finite state transducer, wherein the lexicon finite state transducer may include mapping information which is a probability of predicting a first training word or a first training word sequence from each of the training subwords, and wherein the grammar finite state transducer may include weight information for, when the first training word or the first training word sequence is input, predicting a second training word sequence capable of being arranged after the first training word or the first training word sequence.

The first AI decoding model may be an end-to-end automatic speech recognition (ASR) model.

The method may further include generating the weighted finite state transducer model by: classifying the plurality of named entities according to a plurality of domains different from each other; and generating a plurality of weighted finite state transducer models for the respective plurality of domains by using the classified plurality of named entities.

The method may further include: identifying words corresponding to named entities included in an application executed by the device or a web page provided via the device; and determining a domain into which the application or the web page, by comparing the identified words with a plurality of named entities which are comprised in a vocabulary list of each of the plurality of weighted finite state transducer models generated for the respective plurality of domains.

The method may further include: receiving update information for a vocabulary list from a server, the update information comprising at least one of addition of a new named entity, deletion of the named entity, and modification of the named entity; updating the vocabulary list by using the update information; and generating the weighted finite state transducer model by training the weighted finite state transducer model using the updated vocabulary list.

The method may further include: recognizing that the device enters a new region, by obtaining position information of the device; transmitting entry-into-new-region information of the device to a server of an application service provider; receiving a point-of-interest (POI) vocabulary list from the server of the application service provider, the POI vocabulary list comprising named entities regarding at least one of place names, attractions, tourist spots, or famous restaurants of the new region; and generating the weighted finite state transducer model by training the weighted finite state transducer model using the plurality of named entities included in the received POI vocabulary list.

The generating the weighted finite state transducer model comprises generating the weighted finite state transducer model by training the weighted finite state transducer model using the plurality of named entities that reflect characteristics of the user that are obtained from at least one of an application executed by the device more than a predetermined frequency, log data of a messenger application, and a search term history in a content streaming application.

In accordance with an aspect of the disclosure, there is provided a device for performing speech recognition, including: a speech inputter configured to receive the speech input from a user, at least one memory configured to store one or more computer-readable instructions; and at least one processor configured to execute the one or more computer-readable instructions to: receive a speech input from a user; by using a first artificial intelligence (AI) decoding model, obtain a feature vector indicating a probability of predicting a subword from the received speech input, and obtain a first string comprising a plurality of predicted strings based on the feature vector; input the feature vector to a second AI decoding model that uses a weighted finite state transducer model that is trained to predict a training word or training word sequence representing a named entity, from a training subword extracted from a plurality of named entities; by using the second AI decoding model, obtain a second string based on the feature vector, the second string comprising a recognized word sequence that corresponds to at least one of a plurality of predetermined named entities, and an unrecognized word sequence that does not correspond to any one of the plurality of predetermined named entities; and obtain a text corresponding to the received speech input by substituting the unrecognized word sequence of the second string with a word sequence included in the first string.

The at least one processor may be further configured to execute the one or more computer-readable instructions to generate the weighted finite state transducer model by: obtaining a vocabulary list comprising the plurality of named entities; segmenting a training word or a training string constituting the plurality of named entities into training subwords that are in units of phonemes or syllables; and obtaining a confidence score comprising a posterior probability of predicting one of the plurality of named entities from the training subwords, through state transition using frequencies of the training subwords and arrangement orders of the training subwords.

The at least one processor may be further configured to execute the one or more computer-readable instructions to generate the weighted finite state transducer model by: performing filtering to remove the named entity from the plurality of named entities, based the named entity overlapping with a word pre-stored in the at least memory of the device.

The weighted finite state transducer model may include a lexicon finite state transducer and a grammar finite state transducer, wherein the lexicon finite state transducer may include mapping information which is a probability of predicting a first training word or a first training word sequence from each of the training subwords, and wherein the grammar finite state transducer may include weight information for, when the first training word or the first training word sequence is input, predicting a second training word sequence capable of being arranged after the first training word or the first training word sequence.

The first AI decoding model may be an end-to-end automatic speech recognition (ASR) model.

The at least one processor may be further configured to execute the one or more computer-readable instructions to: classifying the plurality of named entities according to a plurality of domains different from each other; and generating a plurality of weighted finite state transducer models for the respective plurality of domains by using the classified plurality of named entities.

The at least one processor may be further configured to execute the one or more computer-readable instructions to: identify words corresponding to named entities included in an application executed by the device or a web page accessed by the device; and determine a domain into which the application or the web page, by comparing the identified words with the plurality of predetermined named entities which are comprised in a vocabulary list of each of the plurality of weighted finite state transducer models generated for the respective plurality of domains.

The device may further include a communication interface configured to transmit data to and receive data from a server, wherein the at least one processor may be further configured to execute the one or more computer-readable instructions to: receive update information for a vocabulary list from the server by using the communication interface, the update information comprising at least one of addition of a new named entity, deletion of the named entity, and modification of the named entity; update the vocabulary list by using the update information; and generate the weighted finite state transducer model by training the weighted finite state transducer model using the updated vocabulary list.

The device may further include: a position sensor configured to obtain position information of the device; and a communication interface configured to transmit data to and receive data from a speech assistant server or an external server, wherein the at least one processor may be further configured to execute the one or more computer-readable instructions to: recognize that the device enters a new region, based on the position information of the device; in response to recognizing that the device enters the new region, receive a point-of-interest (POI) vocabulary list from an application service provider sever through the communication interface, the POI vocabulary list comprising named entities regarding at least one of place names, attractions, tourist spots, or famous restaurants of the new region; and generate the weighted finite state transducer model by training the weighted finite state transducer model using the plurality of named entities included in the received POI vocabulary list.

The at least one processor may be further configured to execute the one or more computer-readable instructions to generate the weighted finite state transducer model by training the weighted finite state transducer model using the plurality of named entities that reflect characteristics of the user that are obtained from at least one of an application executed by the device more than a predetermined frequency, log data of a messenger application, and a search term history in a content streaming application.

In accordance with an aspect of the disclosure, there is provided a non-transitory computer-readable storage medium storing a program that is executable by a computer to perform the method of performing speech recognition.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
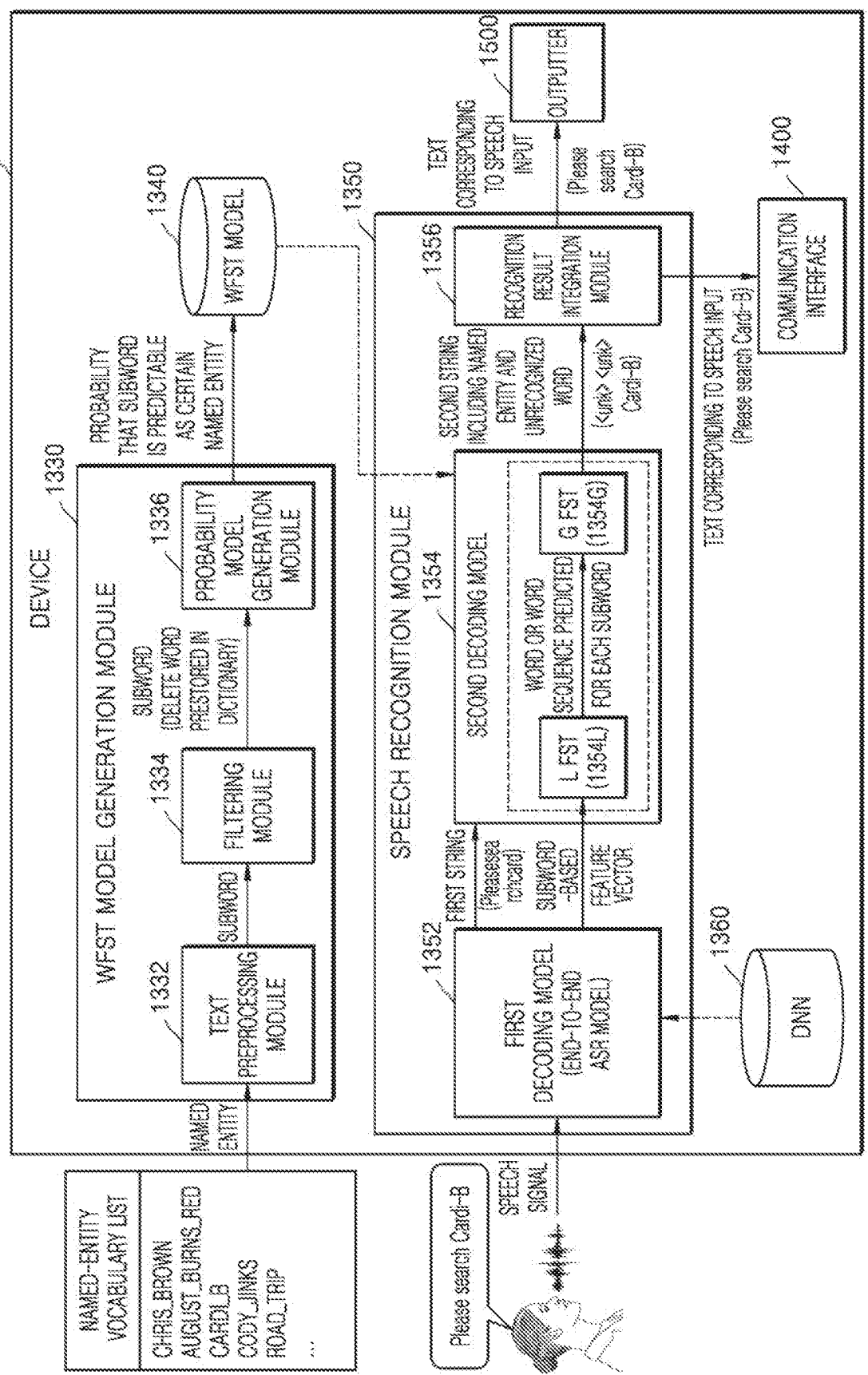
FIG. 1 is a diagram illustrating an operation, performed by a device, of recognizing a speech input of a user, according to an embodiment.

Although terms used herein are of among general terms which are currently and broadly used by considering functions in the disclosure, these terms may vary according to intentions of those of ordinary skill in the art, precedents, the emergence of new technologies, or the like. In addition, there may be terms selected arbitrarily by the applicants in particular cases, and in these cases, the meaning of those terms will be described in detail in the corresponding portions of the detailed description. Therefore, the terms used herein should be defined based on the meaning thereof and descriptions made throughout the specification, rather than based on names simply called.

The singular terms used herein are intended to include the plural forms as well, unless the context clearly indicates otherwise. All terms used herein, including technical and scientific terms, have the same meaning as generally understood by those of ordinary skill in the art.

Throughout the disclosure, the expression "at least one of a, b or c" indicates only a, only b, only c, both a and b, both a and c, both b and c, all of a, b, and c, or variations thereof.

It will be understood that, throughout the specification, when a region such as an element, a component, a layer, or the like is referred to as "comprising" or "including" a component such as an element, a region, a layer, or the like, the region may further include another component in addition to the component rather than excludes the other component, unless otherwise stated. In addition, the term such as " . . . unit", " . . . portion", " . . . module", or the like used herein refers to a unit for processing at least one function or operation, and this may be implemented by hardware, software, or a combination of hardware and software.

The phrase "configured to" used herein may be used interchangeably with, for example, the phrase "suitable for", "having the capacity to", "designed to", "adapted to", "made to", or "capable of", depending upon the circumstances. The phrase "configured to" does not essentially mean "specifically designed in hardware to". Rather, the phrase "system configured to" may mean that the system is able to perform an operation together with another system or parts. For example, the phrase "processor configured to perform A, B, and C" may mean a dedicated processor (such as an embedded processor) for performing the corresponding operations, or a generic-purpose processor (such as a central processing unit (CPU) or an application processor) that may perform the corresponding operations by executing one or more software programs stored in a memory.

As used herein, the term "character" refers to symbols used to write human language in a visible form. For example, the characters may include an alphabet, Korean alphabet (Hangeul), Chinese characters, numbers, phonetic symbols, punctuation marks, and other symbols.

As used herein, the term "string" refers to a sequence of characters.

As used herein, the term "grapheme" refers to the smallest unit which includes at least one character and represents a sound. For example, in the case of an alphabet writing system, one character may be a grapheme, and a string may refer to a sequence of graphemes.

As used herein, the term "text" may include at least one grapheme. For example, the text may include a morpheme or a word.

As used herein, the term "word" refers to a basic unit of language, which includes at least one string and is independently used or represents a grammatical function.

As used herein, the term "word sequence" refers to a sequence of one or more words.

As used herein, the term "subword" refers to a basic unit, for example, a phoneme or a syllable, which constitutes a word. A hidden Marcov model (HMM) method is mainly used as a method used to model a subword, and this is for extracting a feature vector by collecting speech signals corresponding to respective subword units, and then for calculating a probability distribution.

As used herein, the term "label" refers to any subword representing a phoneme or a syllable. The label may be output by an end-to-end automatic speech recognition (ASR) model.

FIG. 1 is a diagram illustrating an operation, performed by a device 1000a, of recognizing a speech input from a user, according to an embodiment.

Referring to FIG. 1, the device 1000a may include a weighted finite state transducer (WFST) model generation module 1330, a WFST model 1340, a speech recognition module 1350, a deep neural network 1360, a communication interface 1400, and an outputter 1500. FIG. 1 illustrates only components necessary for describing operations of the device 1000a. Components included in the device 1000a are not limited to those illustrated in FIG. 1.

The device 1000a may generate the WFST model 1340 for a named entity by using instructions or program code related to the WFST model generation module 1330. The term "named entity" refers to a word or a word sequence having a unique meaning, such as a name of a person, a company name, a place name, a region name, time, or a date. The WFST model generation module 1330 may obtain a vocabulary list including a plurality of named entities. In an embodiment, the WFST model generation module 1330 may obtain the vocabulary list including the plurality of named entities by receiving a user input, by performing reception thereof from an external server, or by crawling a web page, an application executed by the device 1000a, or the like. In the embodiment, shown in FIG. 1, the named-entity vocabulary list may include the plurality of named entities regarding singer names such as Chris Brown, August Burns Red, Cardi-B, Cody Jinks, and Road Trip.

The WFST model generation module 1330 may include a text preprocessing module 1332, a filtering module 1334, and a probability model generation module 1336. While FIG. 1 illustrates that the WFST model generation module 1330 is included in the device 1000a, the WFST model generation module 1330 may be omitted from the device 1000a when the device 1000a is manufactured and provided to an end user, if the device 1000a does not support an online learning. Input data, intermediary processing results, and output data that are used by the WFST model generation module 1330 may be referred to as training data (e.g., named training entities, named subwords, etc.)

The text preprocessing module 1332 is configured to receive, as an input, the plurality of named entities included in the vocabulary list and output a subword by preprocessing the input plurality of named entities. In an embodiment, the text preprocessing module 1332 may segment the plurality of named entities into subwords. The text preprocessing module 1332 may tokenize a word or word sequence, which is included in the plurality of named entities, into subwords by using, for example, a byte pair encoding (BPE) algorithm or a diagram coding algorithm. In an embodiment, the text preprocessing module 1332 may perform preprocessing and/or data compression for removing punctuation marks, special characters, special symbols, and the like and removing stopwords. The named entities that are inputted into the WFST model generation module 1330 for training purposes may be also referred to as named training entities. Also, the subwords obtained by the text preprocessing module 1332 may be also referred to as training subwords.

The filtering module 1334 is configured to perform filtering for removing a vocabulary pre-stored in a dictionary database (DB) 1320 (see FIG. 3) of the device 1000a (that is, in-vocabulary), from subwords output from the text preprocessing module 1332. In an embodiment, the filtering module 1334 may remove the same word or word sequence as the vocabulary pre-stored in the dictionary DB 1320, from the plurality of named entities included in the named-entity vocabulary list. The filtering module 1334 may output only subwords extracted from words corresponding to named entities not included in the dictionary DB 1320 (that is, out-of-vocabulary (OOV) words).

The probability model generation module 1336 may be configured to: perform training regarding a probability that a subword output through the text preprocessing module 1332 and the filtering module 1334 is predictable as a word or word sequence which represents at least one of the plurality of named entities included in the named-entity vocabulary list; and generate the WFST model 1340 as a result of the training. In an embodiment, the probability model generation module 1336 may generate the WFST model 1340 including a finite state transducer that encodes mapping in which each of the subwords extracted from each of the plurality of named entities is taken as an input and a named entity is taken as an output.

The WFST model 1340 is a language model which, when a subword is input, outputs a word or word sequence, based on a probability that the input subword is predictable as a word or word sequence representing a named entity. The WFST model 134 may include a finite state transducer. The finite state transducer may perform state transition on the input subword, based on a preset rule, and may determine a subword that may be arranged after the input subword, according to a result of the state transition. The finite state transducer is a finite automaton in which the state transition is labeled by the input and output subwords. The finite state transducer may be represented by a graph including an arc that connects a node to a node. The node represents a state and the arc represents state transition. An input subword and an output subword are given to each arc. The WFST model 134 is obtained by adding a weight to each arc. The concept of probability may be represented by such a weight. A hypothesis may be generated by tracing each arc from a root node, and an occurrence probability of the hypothesis may be calculated by multiplying the arc by the weight assigned to the arc. The WFST model 134 may output a word or word sequence from a certain subword, based on the occurrence probability.

By using instructions or program code related to the speech recognition module 1350, the device 1000a may obtain a text corresponding to the speech input received from the user and may output the text. The speech recognition module 1350 may include a first decoding model 1352, a second decoding model 1354, and a recognition result integration module 1356. The first decoding model 1352 and the second decoding model 1354 may be also referred to as a first AI decoding model 1352 and a second AI decoding model 1354.

The first decoding model 1352 is configured to: receive, as an input, the speech input received from the user; obtain a feature vector, which is a vector of a probability that a phoneme of the speech signal is predictable as a certain label according to a length of each phoneme of the speech signal; and output a first string based on the probability of the feature vector. Here, the "label", which is a subword representing a phoneme or a syllable, is a token defined by the pre-trained deep neural network 1360. In an embodiment, the first decoding model 1352 may perform speech recognition on the speech signal by an end-to-end ASR method. The end-to-end ASR method is a speech recognition method that uses the deep neural network 1360 trained to directly map a speech signal to a string or a word sequence. Unlike other speech recognition methods using a large number of models such as acoustic models and language models, the end-to-end ASR method may simplify a speech recognition process by using one trained deep neural network 1360. Subordinate embodiments of the end-to-end ASR model include, for example, a recurrent neural network transducer (RNN-T) model, an attention-based model, and the like.

In an embodiment, the first decoding model 1352 may use the end-to-end ASR model that is based on the attention-based model. The attention-based model may include, for example, a transformer or listen-attend-spell (LAS).

The first decoding model 1352 may select one label corresponding to a phoneme for each frame from feature vectors. In an embodiment, the first decoding model 1352 may obtain a softmax including a probability that the phoneme for each frame could match a certain label, by using the end-to-end ASR model. The first decoding model 1352 may select one label from the phoneme for each frame by using the probability of the softmax, may concatenate the selected labels, and may obtain label candidates by representing each phoneme by the corresponding label. The first decoding model 1352 may obtain the first string by using posterior probabilities of the label candidates. In the embodiment, shown in FIG. 1, the user have uttered "Please search for Cardi-B", and the first decoding model 1352 may obtain a speech signal from the utterance of the user and may obtain the first string such as "Please search for card" from the speech signal. The first decoding model 1352 is not able to accurately predict a string corresponding to "Cardi-B", which is a word not stored in the dictionary DB 1320 (see FIG. 3) (Out of Vocabulary).

In an embodiment, the first decoding model 1352 may convert a label-based feature vector into a subword-based feature vector, the label-based feature vector including a probability that the phoneme for each frame could match a certain label. The first decoding model 1352 may output the subword-based feature vector, which is obtained as a result of the conversion, to the second decoding model 1354.

The second decoding model 1354 is configured to: receive the subword-based feature vector that is input from the first decoding model 1352; and obtain, from the subword-based feature vector, a second string including a word, which corresponds to at least one of the plurality of named entities included in the named-entity vocabulary list, and an unrecognized word sequence that is not identified as a named entity. The second decoding model 1354 may output the second string predicted from the subword-based feature vector by using the WFST model 1340. The second decoding model 1354 may calculate a confidence score based on the likelihood, pre-information, and language model for a word for each subword and may select and output a string having a high confidence score.

In an embodiment, the second decoding model 1354 may include a Lexicon FST 1354L and a Grammar FST 1354G. The second decoding model 1354 may output a word or word sequence from the feature vector for each subword by compositing the Lexicon FST 1354L and the Grammar FST 1354G. However, the disclosure is not limited thereto, and the second decoding model 1354 may be configured as one integrated module that outputs a word corresponding to a named entity and an unrecognized word sequence from the feature vector for each subword.

The Lexicon FST 1354L is configured to receive, as an input, the subword-based feature vector and output a word or word sequence predicted based on the subword-based feature vector. The Lexicon FST 1354L may include mapping information, which is a probability that a subword is predictable as a certain word. In an embodiment, the Lexicon FST 1354L may convert a subword sequence s into $P(s|W)$ that is a probability for a word sequence W.

The Grammar FST 1354G is configured to receive, as an input, a word or word sequence of the subword sequence from the Lexicon FST 1354L and output the second string including a word sequence corresponding to a named entity and an unrecognized word sequence. The Grammar FST 1354G may be a model trained regarding a weight for, when a certain word or word sequence is input, predicting a word sequence capable of being arranged after the input word or word sequence. The Grammar FST 1354G may predict the word or word sequence capable of being arranged after the certain word or word sequence by using, for example, a recurrent neural network (RNN) or a statistical n-Gram model. In an embodiment, the Grammar FST 1354G may include information about a language model probability $P(W)$ as a weight for the word sequence W and may output a word or word sequence to which the probability $P(W)$ is added.

In the embodiment, shown in FIG. 1, by using the WFST model 1340, the second decoding model 1354 may obtain the second string, which includes Cardi-B corresponding to a named entity and an unrecognized word<unk>, from the subword-based feature vector that is output from the first decoding model 1352.

The recognition result integration module 1356 is configured to integrate the first string obtained from the first decoding model 1352 with the second string obtained from the second decoding model 1354. The recognition result integration module 1356 may substitute the unrecognized word sequence of the second string with a word sequence included in the first string, thereby outputting a text corresponding to the speech input. In an embodiment, the recognition result integration module 1356 may substitute the unrecognized word sequence included in the second string with a word sequence corresponding to a place of the unrecognized word sequence in the first string. In the embodiment, shown in FIG. 1, the recognition result integration module 1356 may output "Please search for Cardi-B", which is a text corresponding to the speech input, by respectively substituting<unk> and <unk>, which are unrecognized word sequences of the second string, with "Please" and "search", which are included in the first string.

The text that is output from the recognition result integration module 1356 may be provided to the communication interface 1400 or the outputter 1500.

According to speech recognition techniques according to the related art, when a language model is generated, because a text is provided as a completed sentence such as "Show me+<named entity>" or "Let's meet at +<named entity>", training needs to be performed by considering a pattern sentence according to a named entity. In the case of speech recognition according to the related art, because both a large amount of data and a large amount of calculation are required for training, there are issues in that the processing speed is extremely low as in an example in which several hours are required for processing even in a server environment, and in that it is difficult to generate a language model in an on-device environment. In addition, because training regarding all pattern sentences according to each named entity needs to be performed, there is also an issue of the deterioration in recognition rate in use of a language model when there are no patterns.

According to the device 1000a according to an embodiment, the WFST model 1340 may be generated through training using a vocabulary list of named entities which are words not included in the dictionary DB 1320 (see FIG. 3) (that is, out-of-vocabulary words); general utterances, which are not named entities, in the speech input from the user may be decoded by using the first decoding model 1352 that uses the end-to-end ASR method; words, which correspond to named entities, in the speech input from the user may be decoded by using the second decoding model 1354; and the unrecognized word sequence, which is not able to be converted through the second decoding model 1354, may be substituted with the first string obtained through the first decoding model 1352, thereby outputting the text corresponding to the speech input. The device 1000a according to an embodiment may generate the WFST model 1340 including only the plurality of named entities and may output a word or word sequence corresponding to a named entity by using the WFST model 1340, thereby significantly reducing processing time required for decoding for converting the speech input regarding named entities into the text. According to the device 1000a according to an embodiment, because the outputs from both the first decoding model 1352 and the second decoding model 1354 are words, there is also an advantage in that a separate operation of aligning positions of pattern sentences for named entities may be omitted.

In addition, according to the device 1000a according to an embodiment, because speech recognition is able to be performed even without pattern sentences for each of the plurality of named entities, the amount of data calculation may be reduced, and thus, speech recognition may be performed even by the device 1000a having a relatively lower calculation capability than a server. The device 1000a according to an embodiment may recognize the speech input regarding named entities and convert the speech input into words by using the WFST model 1340, thereby improving the accuracy of speech recognition.

Figure 2:
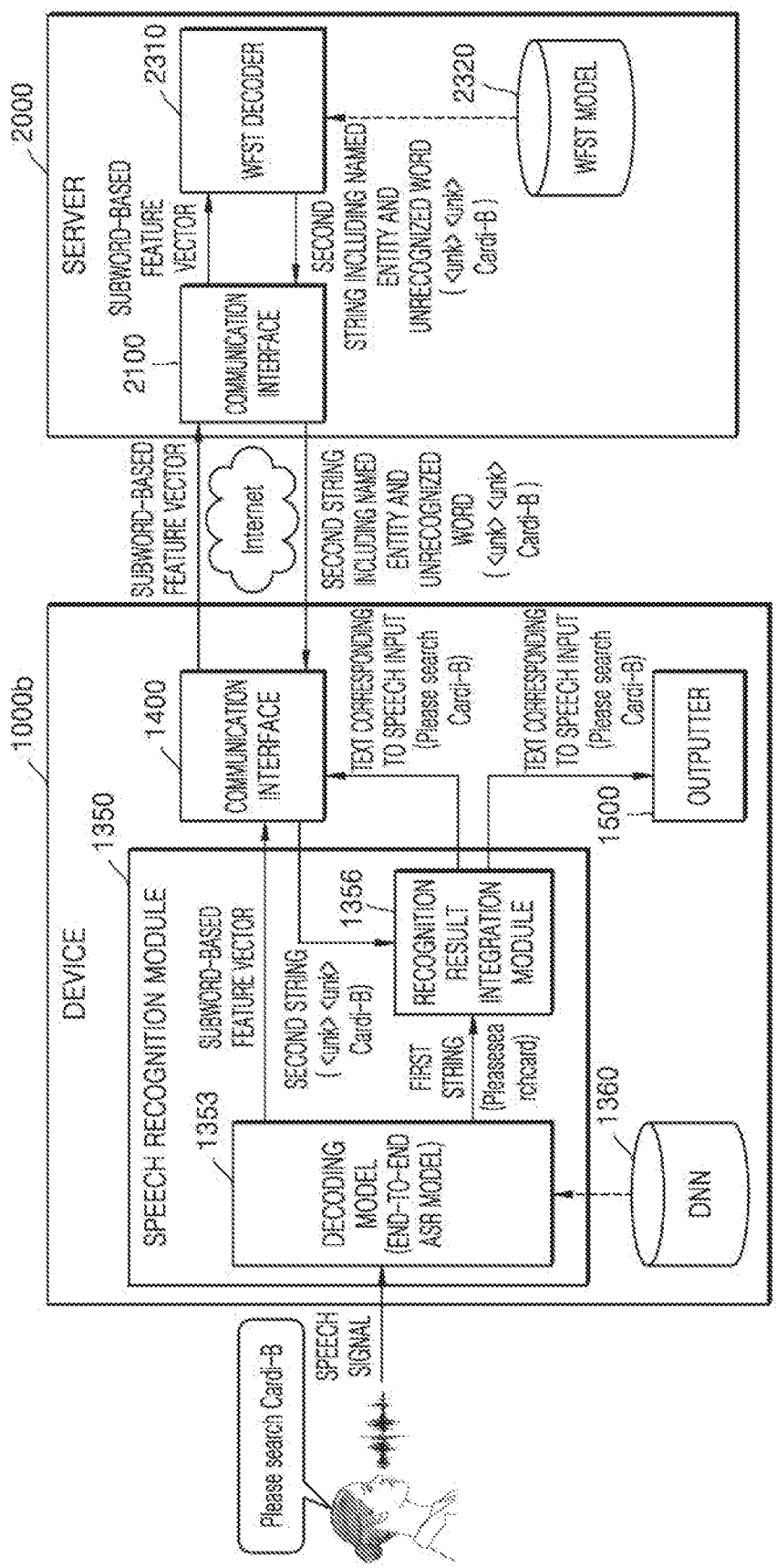
FIG. 2 is a diagram illustrating an operation, performed by a device and a server, of recognizing a speech input of a user, according to an embodiment.

FIG. 2 is a diagram illustrating an operation, performed by a device 1000b and a server 2000, of recognizing a speech input from a user, according to an embodiment.

Referring to FIG. 2, the device 1000b may include the speech recognition module 1350, the deep neural network 1360, the communication interface 1400, and the outputter 1500. The server 2000 may include a communication interface 2100 and a WFST decoder 2310. FIG. 2 illustrates only components necessary for describing operations of the device 1000b and the server 2000. Components included in the device 1000b and the server 2000 are not limited to those illustrated in FIG. 2.

By using instructions or program code related to the speech recognition module 1350, the device 1000b may obtain a text corresponding to a speech input received from a user and may output the text. The speech recognition module 1350 may include a decoding model 1353 and the recognition result integration module 1356.

The decoding model 1353 is configured to: receive, as an input, a speech signal received from the user; obtain a feature vector that is a vector of a probability that a phoneme is predictable as a certain subword according to a length of each phoneme of the speech signal; and output a first string based on the probability of the feature vector. Because the decoding model 1353 shown in FIG. 2 is the same as the first decoding model 1352 shown in FIG. 1 except that the decoding model 1353 outputs a subword-based feature vector to the communication interface 1400 and outputs the first string to the recognition result integration module 1356, repeated descriptions thereof will be omitted.

In an embodiment, the decoding model 1353 may generate a lattice by concatenating labels to each other and may provide the generated lattice to the communication interface 1400, wherein the labels have highest likelihood that a phoneme in any time domain, in the subword-based feature vectors, is predictable as a certain label, that is, the labels have highest probabilities among the probabilities of the feature vectors.

The communication interface 1400 transmits the subword-based feature vector, which is input from the decoding model 1353, to the server 2000. In an embodiment, the communication interface 1400 may transmit the subword-based feature vector to the server 2000 through a wired or wireless network.

In an embodiment, the communication interface 1400 may transmit the lattice, which is input from the decoding model 1353, to the server 2000. Because the data size of the lattice is less than the data size of the feature vector of each subword, when the communication interface 1400 transmits the lattice to the server 2000, transfer time may be reduced as compared with the case of transmitting the subword-based feature vector, and unexpected data loss may also be prevented.

The server 2000 may receive the subword-based feature vector from the device 1000b through the communication interface 2100. The server 2000 may obtain a second string including a named entity and an unrecognized word from the subword-based feature vector, by using instructions and program code related to the WFST decoder 2310.

The WFST decoder 2310 is configured to obtain the second string by using the WFST model 2320, the second string including a word, which corresponds to at least one of the plurality of named entities included in the named-entity vocabulary list, and an unrecognized word sequence that is not identified as a named entity. The WFST model 2320 is a model outputting a word or word sequence when a subword is input thereto, based on a probability that the subword is predictable as a word or word sequence representing a certain named entity. Because the WFST model 2320 is the same as the WFST model 1340 shown in FIG. 1 except that the WFST model 2320 is generated by the server 2000 and stored in the server 2000, repeated descriptions thereof will be omitted. The WFST decoder 2310 may include the Lexicon FST 1354L and the Grammar FST 1354G, identically to the second decoding model 1354 shown in FIG. 1. However, the disclosure is not limited thereto, and the WFST decoder 2310 may be configured as one integrated module which, when the subword-based feature vector is input thereto, outputs a word or word sequence having high likelihood based on the probability of the feature vector.

Because the WFST decoder 2310 performs the same operations or functions as those of the second decoding model 1354 shown in FIG. 1, repeated descriptions thereof will be omitted.

The WFST decoder 2310 may output the second string including a named entity and an unrecognized word to the communication interface 2100.

The server 2000 may transmit the second string including the named entity and the unrecognized word to the device 1000b by using the communication interface 2100.

The device 1000b may receive the second string from the server 2000 by using the communication interface 1400. The communication interface 1400 may provide the second string, which is received from the server 2000, to the recognition result integration module 1356.

The recognition result integration module 1356 is configured to integrate the first string obtained from the decoding model 1353 with the second string obtained from the WFST decoder 2310 of the server 2000. The recognition result integration module 1356 may output a text corresponding to the speech input by substituting the unrecognized word sequence of the second string with a word sequence included in the first string. In the embodiment, shown in FIG. 2, the recognition result integration module 1356 may output "Please search for Cardi-B", which is the text corresponding to the speech input, by respectively substituting<unk> and <unk>, which are the unrecognized word sequences of the second string, with "Please" and "search", which are included in the first string.

The text that is output from the recognition result integration module 1356 may be provided to the communication interface 1400 or the outputter 1500.

Unlike the device 1000a shown in FIG. 1, in the embodiment, shown in FIG. 2, the device 1000b may decode only a general string, for example, the first string such as "Please search for card", instead of decoding a named entity, by way of the decoding model 1353 that uses the end-to-end ASR model, and the server 2000 may decode the second string including a named entity and an unrecognized word by way of the WFST decoder 2310 that uses the WFST model 2320 trained by using the plurality of named entities. In the embodiment, shown in FIG. 2, because the server 2000 has a higher data calculation or processing capability for training than the device 1000b, the WFST model 2320 may be quickly generated by using the plurality of named entities and may be updated through real-time training regarding a new named entity. Therefore, in the embodiment, shown in FIG. 2, the device 1000b may accurately convert the speech input regarding the latest named entity into a text by way of the server 2000, and because there is no need to generate a WFST model through training using a vocabulary list including a plurality of named entities, the processing speed may also be improved. In addition, in an embodiment, the decoding model 1353 of the device 1000b may transmit the lattice to the server 2000 rather than transmits the subword-based feature vector to the server 2000, thereby reducing the amount of data transmission and improving the speed of data communication with the server 2000.

Figure 3:
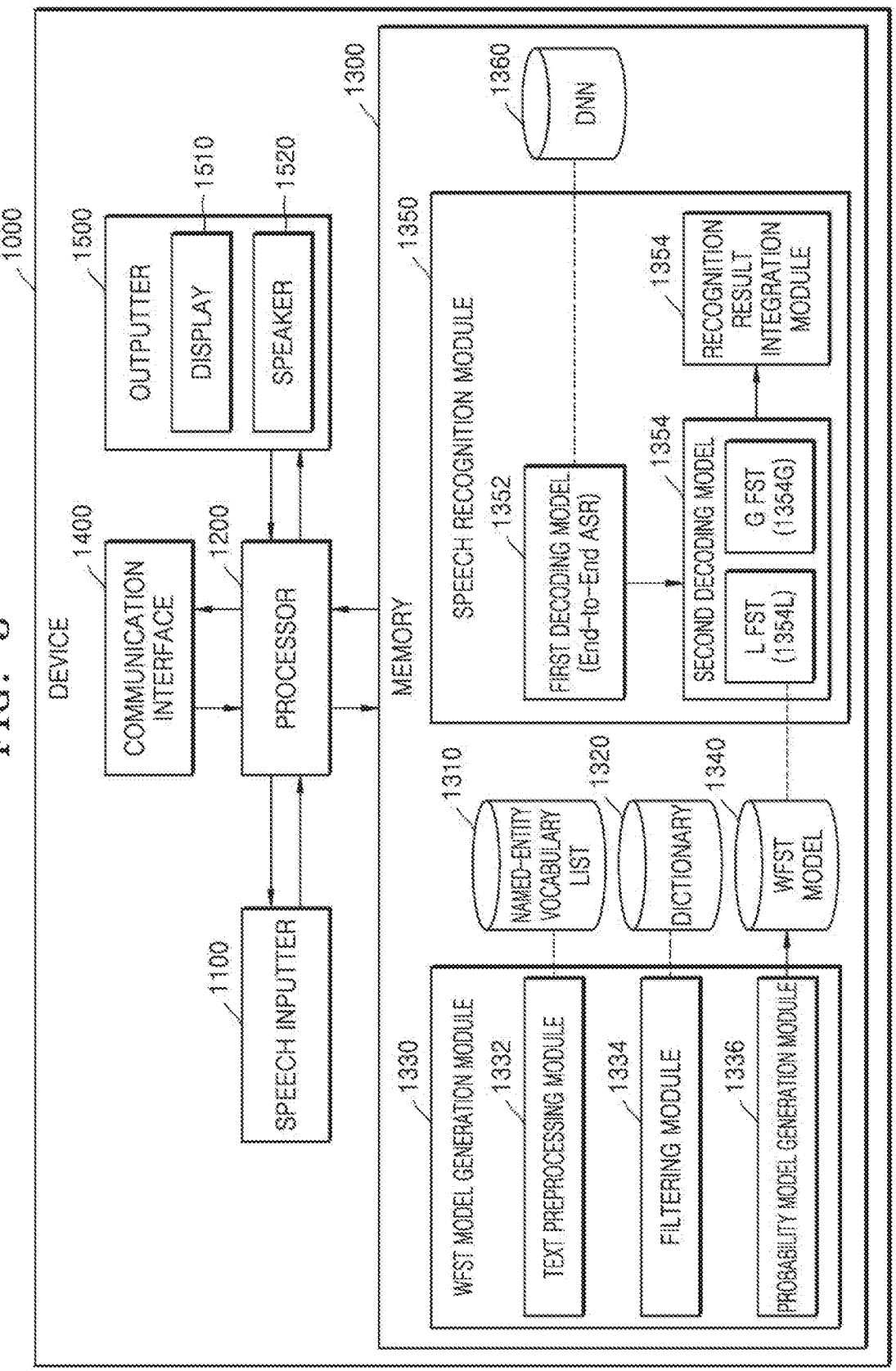
FIG. 3 is a block diagram illustrating components of a device, according to an embodiment.

FIG. 3 is a block diagram illustrating components of a device 1000, according to an embodiment.

The device 1000 may include an electronic device that receives a speech input of a user and converts the speech input into a text by processing the speech input. The device 1000 may include, for example, at least one of a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical device, a camera, or a wearable device. However, the device 1000 is not limited to the examples set forth above.

The device 1000 may include a speech inputter 1100, a processor 1200, a memory 1300, the communication interface 1400, and the outputter 1500.

The speech inputter 1100 may receive the speech input from the user. In an embodiment, the speech inputter 1100 may include a microphone. The speech inputter 1100 may receive the speech input (for example, an utterance of the user) from the user through the microphone and may obtain a speech signal from the speech input. In an embodiment, the processor 1200 of the device 1000 may convert a sound received through the microphone into a sound signal and removing noise (for example, a non-speech component) from the sound signal, thereby obtaining the speech signal.

The device 1000 may include a speech preprocessing module that has a function of sensing a specified speech input (for example, a wake-up input such as "Hi Bixby" or "Okay Google") or a function of preprocessing speech signals obtained from some speech inputs.

The processor 1200 may execute one or more instructions of a program stored in the memory 1300. The processor 1200 may include a hardware component for performing arithmetic, logic, and input/output operations and signal processing. For example, the processor 1200 may include, but is not limited to, at least one of a central processing unit (CPU), a microprocessor, a graphic processing unit, application-specific integrated circuits (ASICs), digital signal processors (DSPs), digital signal processing devices (DSPDs), programmable logic devices (PLDs), or field programmable gate arrays (FPGAs).

In the memory 1300, the program including the instructions for converting the speech input from the user into a text by processing the speech input, which is received from the user through the speech inputter 1100, may be stored. In the memory 1300, instructions and program code capable of being read by the processor 1200 may be stored. In the following embodiments, the processor 1200 may be implemented by executing instructions or codes of a program stored in a memory.

In the memory 1300, pieces of data, which respectively correspond to a named-entity vocabulary DB 1310, the dictionary DB 1320, the WFST model generation module 1330, the WFST model 1340, the speech recognition module 1350, and the deep neural network 1360, may be stored.

The memory 1300 may include, for example, at least one of a flash memory type storage medium, a hard disk type storage medium, a multimedia card micro type storage medium, card type memory (for example, Secure Digital (SD) memory, eXtreme Digital (XD) memory, or the like), random access memory (RAM), static random access memory (SRAM), read-only memory (ROM), electrically erasable programmable read-only memory (EEPROM), programmable read-only memory (PROM), magnetic memory, a magnetic disk, or an optical disk.

The processor 1200 may generate the WFST model 1340 for a named entity by using the instructions or the program code, which is stored in the memory 1300 and related to the WFST model generation module 1330. The term "named entity" refers to a word or word sequence having a unique meaning, such as a name of a person, a company name, a place name, a region name, time, or a date.

The processor 1200 may obtain a vocabulary list including a plurality of named entities and may store the obtained vocabulary list regarding the named entities in the named-entity vocabulary DB 1310. In an embodiment, by using the instructions or the program code of the WFST model generation module 1330, the processor 1200 may obtain the vocabulary list including the plurality of named entities by receiving a user input, by performing reception thereof from an external server, or by crawling a web page, an application executed by the device 1000, or the like. For example, the processor 1200 may obtain words or word sequences, which correspond to a plurality of named entities included in an application, from an application programming interface (API) of the application that is running. For example, in the case of a music streaming application, the processor 1200 may obtain named entities such as song titles, artist names, composer names, and the like regarding pieces of music, which are included in a playlist of a user or currently being reproduced, and may store the obtained named entities in the named-entity vocabulary DB 1310.

The WFST model generation module 1330 may include the text preprocessing module 1332, the filtering module 1334, and the probability model generation module 1336.

The text preprocessing module 1332 is configured to receive, as an input, the plurality of named entities included in the vocabulary list and output subwords by preprocessing the input plurality of named entities. In an embodiment, by using instructions or program code related to the text preprocessing module 1332, the processor 1200 may segment the plurality of named entities stored in the named-entity vocabulary list DB 1310 into subwords. The term "subword" is a basic unit constituting a word and refers to, for example, a phoneme or a syllable. The processor 1200 may segment the plurality of named entities into subwords by using a hidden Marcov model (HMM). However, the disclosure is not limited thereto. As another example, the processor 1200 may tokenize a word or word sequence included in the plurality of named entities into subwords by using a byte pair encoding (BPE) algorithm.

In an embodiment, by using the text preprocessing module 1332, the processor 1200 may perform preprocessing for removing punctuation marks, special characters, special symbols, or the like included in the plurality of named entities and removing stopwords.

The filtering module 1334 is configured to perform filtering for removing vocabularies pre-stored in the dictionary DB 1320 from the subwords output from the text preprocessing module 1332. In an embodiment, by using the filtering module 1334, the processor 1200 may perform filtering for removing the same word or word sequence as the vocabulary pre-stored in the dictionary DB 1320 from the plurality of named entities included in the named-entity vocabulary list DB 1310. The processor 1200 may obtain only subwords extracted from words corresponding to named entities not included in the dictionary DB 1320, through the filtering.

The probability model generation module 1336 is configured to: perform training regarding a probability that a subword output through the text preprocessing module 1332 and the filtering module 1334 is predictable as a word or word sequence representing at least one of the plurality of named entities included in the named entity vocabulary list; and generate the WFST model 1340 as a result of the training. In an embodiment, by using the instructions or the program code of the probability model generation module 1336, the processor 1200 may generate the WFST model 1340 including a finite state transducer that encodes mapping in which each of the subwords extracted from the respective plurality of named entities stored in the named-entity vocabulary list DB 1310 is taken as an input and a named entity is taken as an output.

In an embodiment, the processor 1200 may classify the plurality of named entities stored in the named-entity vocabulary list DB 1310 according to a plurality of domains different from each other and may generate a plurality of WFST models 1340 for the respective domains by using the classified plurality of named entities. Here, the term "domain" refers to a field or a category related to a speech input received from a user and may be preset according to, for example, the meaning of the speech input, the attribute of the speech input, or the like. The domain may be classified according to a service related to the speech input. The domain may include, for example, one or more domains such as a movie domain, a music domain, a book domain, a game domain, an aviation domain, a food domain, and the like. Embodiments, in which the processor 1200 generates the plurality of WFST models 1340 for the respective domains and automatically determines a domain by using the generated plurality of WFST models 1340, will be described in detail with reference to FIGS. 7 and 8.

In an embodiment, by using the communication interface 1400, the processor 1200 may receive a POI vocabulary list, which includes named entities regarding at least one of place names, attractions, tourist spots, or famous restaurants of a new region, from a server of an application service provider and may generate the WFST model 1340 through training using the named entities included in the received POI vocabulary list. For example, the application may include a navigation application. Particular embodiments, in which the processor 1200 receives the POI vocabulary list by using the named entities regarding the new region and generates the WFST model 1340 by using the POI vocabulary list, will be described in detail with respect to FIGS. 10 and 11.

In an embodiment, the processor 1200 may store, in the named-entity vocabulary list DB 1310, a plurality of named entities reflecting characteristics of a user from at least one of a frequently running application, log data of a messenger application, or a search term history in a content streaming application and may generate the WFST model 1340 through training using a stored personalized (or customized) vocabulary list. A particular embodiment, in which the processor 1200 generates the WFST model 1340 by using the personalized (or customized) vocabulary list, will be described in detail with reference to FIG. 12.

The WFST model 1340 is a language model which, when a subword is input, outputs a word or word sequence, based on a probability that the input subword is predictable as a word or word sequence representing a named entity. The WFST model 134 may output a word or word sequence from a certain subword, based on an occurrence probability.

The speech recognition module 1350 is a module configured to output a text corresponding to a speech input from a user by processing the speech input obtained through the speech inputter 1100. The speech recognition module 1350 may include the first decoding model 1352, the second decoding model 1354, and the recognition result integration module 1356.

The first decoding model 1352 is configured to: receive a speech input; obtain a speech signal from the received speech input; obtain a feature vector, which is a vector of a probability that a phoneme of the speech signal is predictable as a certain label according to a length of each phoneme of the speech signal; and output a first string based on the probability of the feature vector. Here, the "label" is a token defined by the pre-trained deep neural network 1360. In an embodiment, the "label" may be any subword representing a phoneme or a syllable. The label may have, but is not limited to, the same concept as a subword.

In an embodiment, the first decoding model 1352 may perform speech recognition on the speech signal by the end-to-end ASR method. The end-to-end ASR method is a speech recognition method that uses the deep neural network 1360 trained to directly map the speech signal to a string or a word sequence. Unlike other speech recognition methods using a large number of models such as acoustic models and language models, the end-to-end ASR method may simplify a speech recognition process by using one trained deep neural network 1360. Subordinate embodiments of the end-to-end ASR model include, for example, an RNN-T model, an attention-based model, and the like.

In an embodiment, the first decoding model 1352 may use the end-to-end ASR model that is based on the attention-based model. The attention-based model may include, for example, a transformer or listen-attend-spell (LAS).

In an embodiment, the speech recognition module 1350 may further include a speech input preprocessing module. By using instructions or program code of the speech input preprocessing module, the processor 1200 may perform analog/digital (A/D) conversion on the speech input and may frame a speech signal, which is output as a digital signal, by using windows, which have a certain length and partially overlap each other by as much as a certain shift. By using the speech input preprocessing module, the processor 1200 may perform certain signal processing on each of the frames obtained from the speech input preprocessing module and may extract a feature vector by extracting a speech feature of the frame. The speech feature may include a Mel-frequency cepstrum coefficient (MFCC), a primary differential, a quadratic differential, or the like.

By using instructions or program code related to the first decoding model 1352, the processor 1200 may extract, from the signal-processed speech signal, the feature vector representing a posterior probability that the frame at each time corresponds to a certain label. In an embodiment, the feature vectors may be softmax columns including posterior probabilities that speech signals having certain lengths is predictable as certain labels. A sum of all the probabilities included in respective softmax columns is 1.

By using the first decoding model 1352, the processor 1200 may select one label for each frame from the feature vectors obtained time-sequentially and may obtain label candidates by concatenating the selected labels and representing each phoneme by a corresponding label. The processor 1200 may obtain the first string by using posterior probabilities of the label candidates. For example, when the speech input received from the user is an utterance "Please search for Cardi-B", the processor 1200 may obtain the first string such as "Please search for card" from a speech signal extracted from the utterance of the user, by using the first decoding model 1352. In this case, the processor 1200 is not able to accurately predict a string corresponding to "Cardi-B", which is a named entity not stored in the dictionary DB 1320.

In an embodiment, the first decoding model 1352 may convert a label-based feature vector into a subword-based feature vector and may output the subword-based feature vector, which is obtained as a result of the conversion, to the second decoding model 1354.

The second decoding model 1354 is configured to obtain a second string from the subword-based feature vector, the second string including a word, which corresponds to at least one of the plurality of named entities included in the named-entity vocabulary list, and an unrecognized word sequence not identified as a named entity. The second decoding model 1354 may output the second string, which is predicted from the subword-based feature vector, by using the WFST model 1340. By using instructions or program code related to the second decoding model 1354, the processor 1200 may calculate a confidence score based on the likelihood, pre-information, and language model for a word for each subword, may select a string having a high confidence score, and may output the second string including the selected string.

The second decoding model 1354 may include the Lexicon FST 1354L and the Grammar FST 1354G. The second decoding model 1354 may output a word or word sequence from a subword sequence (label) by compositing a Token FST 1354T, the Lexicon FST 1354L, and the Grammar FST 1354G.

The Lexicon FST 1354L is configured to receive, as an input, a subword-based feature vector from the first decoding model 1352 and output a word or word sequence predicted based on the subword-based feature vector. The processor 1200 may include mapping information, which is a probability that a subword is predictable as a certain word, by using instructions or program code related to the Lexicon FST 1354L. In an embodiment, the Lexicon FST 1354L may convert a subword sequence s into P(s|W) which is a probability for a word sequence W.

The Grammar FST 1354G is configured to receive, as an input, a word or word sequence of the subword sequence from the Lexicon FST 1354L and output the second string including a word sequence corresponding to a named entity and an unrecognized word sequence. The Grammar FST 1354G may be a model trained regarding a weight for, when a certain word or word sequence is input, predicting a word sequence capable of being arranged after the input word or word sequence. The Grammar FST 1354G may predict a word or word sequence capable of being arranged after a certain word or word sequence by using, for example, a recurrent neural network (RNN) or a statistical n-Gram model. In an embodiment, by using instructions or program code related to the Grammar FST 1354G, the processor 1200 may include information about a language model probability P(W) as a weight for a word sequence W and may output a word or word sequence to which the probability P(W) is added.

By using instructions or program code of the second decoding model 1354, the processor 1200 may calculate a word posterior probability P(W|X) by combining P(s|X), which is a probability that an input X of a label-based feature vector will be predicted as a subword s, with P(W|s), which is a probability that the subword s will be predicted as a word or word sequence W, and may output a word or word sequence corresponding to a named entity by searching for a hypothesis in which the word posterior probability P(W|X) is maximized. The processor 1200 may obtain a word, for example, "Cardi-B", which corresponds to a named entity learned through the WFST model 1340. However, when using the second decoding model 1354, the processor 1200 may not identify a word or word sequence except for named entities learned by the WFST model 1340 and may output the word or word sequence as an unrecognized word sequence (that is, <unk> <unk>). The processor 1200 may obtain the second string including a named entity and an unrecognized word sequence.

The recognition result integration module 1356 is configured to integrate the first string, which is obtained from the first decoding model 1352, with the second string, which is obtained from the second decoding model 1354. By using instructions or program code related to the recognition result integration module 1356, the processor 1200 may output a text corresponding to the speech input by substituting the unrecognized word sequence of the second string with a word sequence included in the first string. In an embodiment, the processor 1200 may substitute the unrecognized word sequence included in the second string with a word sequence corresponding to a place of the unrecognized word sequence in the first string. The processor 1200 may obtain "Please search for Cardi-B", which is the text corresponding to the speech input, by respectively substituting<unk> and <unk>, which are unrecognized word sequences of the second string, with "Please" and "search", which are included in the first string.

The processor 1200 may provide the text obtained through the speech recognition module 1350 to the communication interface 1400 or the outputter 1500.

The communication interface 1400 may perform data communication with the server 2000 (see FIG. 2), a server of an application service provider, or another device. The communication interface 1400 may transmit data to or receive data from the server 2000, the server of the application service provider, or the other device by using at least one of data communication methods including, for example, a wired local area network (LAN), a wireless LAN, Wi-Fi, Bluetooth, Zigbee, Wi-Fi Direct (WFD), Infrared Data Association (IrDA), Bluetooth Low Energy (BLE), Near Field Communication (NFC), wireless broadband Internet (Wibro), World Interoperability for Microwave Access (WiMAX), Shared Wireless Access Protocol (SWAP), Wireless Gigabit Allicance (WiGig), and RF communication.

The outputter 1500 may output the text corresponding to the speech input. The outputter 1500 may inform the user about a result of speech recognition, that is, the text, or may transmit the result of speech recognition, that is, the text, to an external device (for example, a smart phone, a household appliance, a wearable device, a server, or the like). The outputter 1500 may include a display 1510 and a speaker 1520.

The display 1510 may display the text converted from the speech input. The display 1510 may include, for example, at least one of a liquid crystal display, a thin film transistor-liquid crystal display, an organic light-emitting diode, a flexible display, a 3-dimensional (3D) display, or an electrophoretic display.

The speaker 1520 may output an audio signal corresponding to the text.

Figure 4:
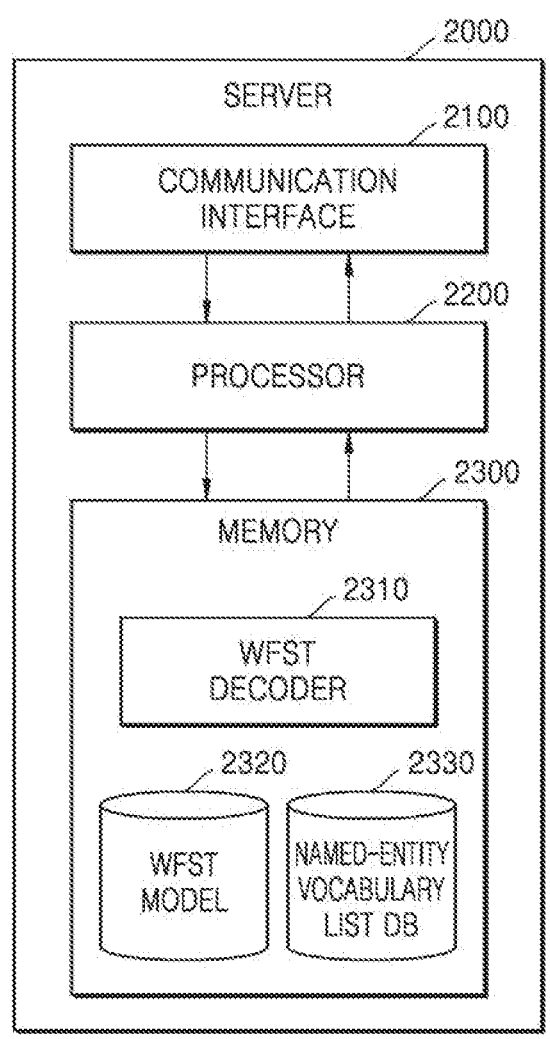
FIG. 4 is a block diagram illustrating components of a server, according to an embodiment.

FIG. 4 is a block diagram illustrating components of the server 2000, according to an embodiment.

The server 2000 may receive a subword-based feature vector from the device 1000, may convert the received feature vector into a string, and may transmit the converted string to the device 1000.

Referring to FIG. 4, the server 2000 may include the communication interface 2100, a processor 2200, and a memory 2300.

The communication interface 2100 may perform data transmission and data reception between the server 2000 and the device 1000. The communication interface 2100 may transmit data to or receive data from the device 1000 by using at least one of data communication methods including, for example, a wired LAN, a wireless LAN, Wi-Fi, WFD, Wibro, WiMAX, SWAP, WiGig, and RF communication.

The communication interface 2100 may receive a sub-word-based feature vector from the device 1000. In an embodiment, the communication interface 2100 may receive a lattice from the device 1000. The lattice may be generated by the device 1000 by concatenating labels having the highest probabilities among probabilities of feature vectors and may be transmitted from the device 1000 to the server 2000. In an embodiment, the communication interface 2100 may transmit a second string obtained by the WFST decoder 2310 to the device 1000, according to control by the processor 2200. The second string may include a word regarding a named entity and an unrecognized word sequence that is not identified as a named entity.

The processor 2200 may execute one or more instructions of a program stored in the memory 2300. The processor 2200 may include a hardware component for performing arithmetic, logic, and input/output operations and signal processing. For example, the processor 2200 may include, but is not limited to, at least one of a CPU, a microprocessor, a graphic processing unit, ASICs, DSPs, DSPDs, PLDs, or FPGAs.

In the memory 2300, the program including instructions regarding each of the WFST decoder 2310, a WFST model 2320, and a named-entity vocabulary DB 2330. In the memory 2300, instructions and program code capable of being read by the processor 2200 may be stored. In the following embodiments, the processor 2200 may be implemented by executing instructions or codes of a program stored in a memory.

The memory 2300 may include, for example, at least one of a flash memory type storage medium, a hard disk type storage medium, a multimedia card micro type storage medium, card type memory (for example, SD memory, XD memory, or the like), RAM, SRAM, ROM, EEPROM, PROM, magnetic memory, a magnetic disk, or an optical disk. However, the disclosure is not limited thereto.

The WFST decoder 2310 is configured to obtain the second string by using the WFST model 2320, the second string including a word, which corresponds to at least one of the plurality of named entities included in the named-entity vocabulary list, and an unrecognized word sequence that is not identified as a named entity. In an embodiment, the WFST decoder 2310 may include a module which, when a subword-based feature vector is input, outputs a word or word sequence having high likelihood based on a probability of the feature vector.

By using the instructions or the program code regarding the WFST decoder 2310, the processor 220 may obtain a string, which includes a word corresponding to a named entity and an unrecognized word, by decoding the subword-based feature vector received from the device 1000. The processor 2200 may control the communication interface 2100 to transmit the obtained string to the device 1000.

The WFST model 2320 is a model outputting a word or word sequence when a subword is input thereto, based on a probability that the subword is predictable as a word or word sequence representing a certain named entity. The WFST model 2320, which is a model generated or updated by the processor 2200, may be generated by performing training regarding a probability that a certain subword is predictable as a word or word sequence that represents at least one of the plurality of named entities included in the named-entity vocabulary list DB 2330. In an embodiment, the processor 2200 may generate the WFST model 2320 including a finite state transducer that encodes mapping in which each subword extracted from each of the plurality of named entities stored in the named-entity vocabulary list DB 2330 is taken as an input and a named entity is taken as an output.

The named-entity vocabulary list DB 2330 is a database storing vocabularies corresponding to the plurality of named entities. In an embodiment, the processor 2200 may obtain vocabularies corresponding to new named entities from new applications, web pages, video streaming services, games, or the like and may update the named-entity vocabulary list DB 2330 by using the obtained vocabularies.

The processor 2200 may transmit update information for the named-entity vocabulary list DB 2330 through the communication interface 2100. Here, the "update information for the named-entity vocabulary list DB 2330" may include, for example, at least one of: at least one new named entity that is newly added to the named-entity vocabulary list DB 2330; domain information for classifying each of the at least one new named entity; application information related to the new named entity; deletion information of a pre-stored named entity; or modification information of the pre-stored named entity. In an embodiment, the processor 2200 may transmit the update information for the named-entity vocabulary list DB 2330 to the device 1000 according to a preset cycle, for example, every 6 hours, every day, every week, or every month. However, the disclosure is not limited thereto. In another embodiment, the processor 2200 may transmit the update information for the named-entity vocabulary list DB 2330 to the device 1000 every time when the addition of new named-entity vocabularies, the deletion, or the modification is performed on the named-entity vocabulary list DB 2330.

The device 1000 may receive the update information for the named-entity vocabulary list DB 2330 from the server 2000 and may update the named-entity vocabulary list DB 1310 stored in the device 1000 by using the received update information for the named-entity vocabulary list DB 2330. A particular embodiment, in which the device 1000 updates the named-entity vocabulary list DB 1310 by using the update information received from the server 2000, will be described in detail with reference to FIG. 9.

Figure 5:
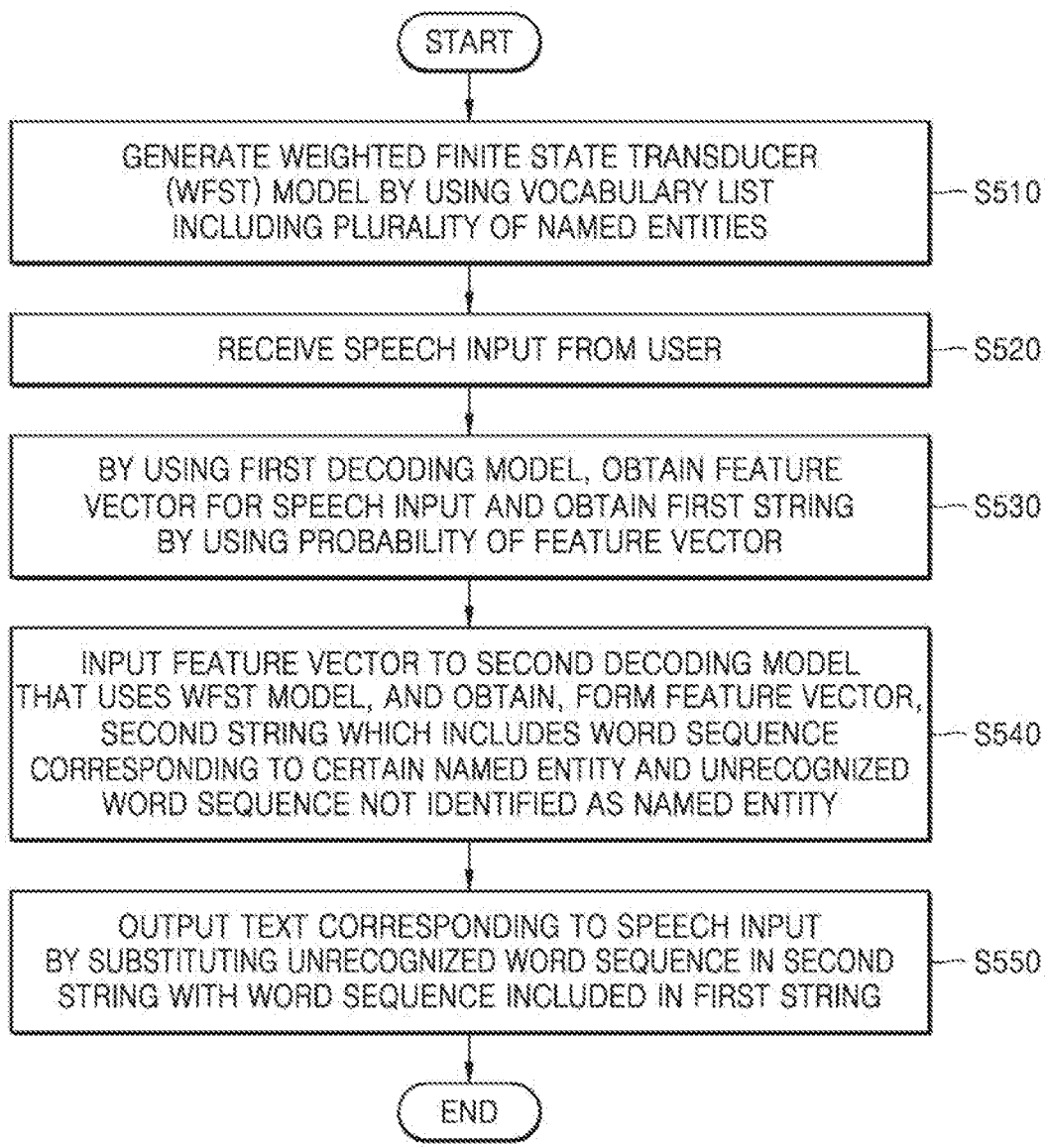
FIG. 5 is a flowchart illustrating a method, performed by a device, of recognizing a speech input of a user, according to an embodiment.

FIG. 5 is a flowchart illustrating an embodiment, in which the device 1000 recognizes a speech input.

In operation S510, the device 1000 generates a WFST model by using a vocabulary list including a plurality of named entities. The device 1000 may generate the WFST model in the background in a standby mode or during the execution of an application, by using words or word sequences corresponding to the plurality of named entities stored in the named-entity vocabulary list DB 1310 (see FIG. 3). However, the disclosure is not limited thereto. In an embodiment, the device 1000 may sense a preset speech input, for example, a wake-up input such as "Hi Bixby" or "Okay Google", and may generate the WFST model for named entities in response to the wake-up input. In another embodiment, when receiving a user input performed by pressing a button for executing a voice assistant service (for example, Bixby or Google Assistant) or a user input performed by touching a graphic user interface (GUI) displayed on the display 1510 (see FIG. 3), the device 1000 may generate the WFST model for named entities.

In an embodiment, the device 1000 may obtain a named entity by receiving a user input performed by entering the named entity, by receiving the named entity from an external server, or by crawling a web page, an application executed by the device 1000, or the like. The device 1000 may store the obtained named entity in the named-entity vocabulary list DB 1310.

The device 1000 may segment a word or word sequence constituting the plurality of named entities, which are included in the named-entity vocabulary list DB 1310, into subwords that are in units of phonemes or syllables. In an embodiment, the device 1000 may tokenize the word or the word sequence included in the plurality of named entities into subwords by using a BPE algorithm.

In an embodiment, the device 1000 may generate a statistical model including a probability graph of a posterior probability that a subword is predictable as at least one particular named entity among the plurality of named entities. The device 1000 may generate the WFST model for named entities by performing training regarding weights through state transition using frequencies of subwords and arrangement orders of subwords.

The WFST model may include a Lexicon FST, which includes mapping information that is a probability that a subword is predictable as a certain word, and a Grammar FST, which includes weight information for predicting a word sequence coming after a certain word or word sequence when the certain word or word sequence is input. The WFST model may be configured by compositing the Lexicon FST and the Grammar FST.

In operation S520, the device 1000 receives a speech input from a user. In an embodiment, the device 1000 may receive the speech input (for example, an utterance of the user) from the user through a microphone may obtain a speech signal from the received speech input. In an embodiment, the processor 1200 (see FIG. 3) of the device 1000 may convert a sound received through the microphone into a sound signal and may obtain the speech signal by removing noise (for example, a non-speech component) from the sound signal.

The received speech input from the user in operation S520 may be, but is not limited to, a speech command related to an operation or a function, which the user intends to perform via the device 1000. In an embodiment, the speech input from the user may include a wake-up input and a speech command related to an operation or a function.

When the speech input from the user includes the wake-up input, operation S520 may be performed before operation S510. For example, when the user has spoken "Hi Bixby, let me know the weather today", the device 1000 may simultaneously receive a wake-up input "Hi Bixby" and a speech command "let me know the weather today". In this case, the device 1000 may generate the WFST model for named entities in response to the received speech input.

In operation S530, the device 1000 obtains a feature vector for the speech input by using a first decoding model and obtains a first string by using a probability of the feature vector. In an embodiment, the device 1000 may extract the feature vector by using the first decoding model, the feature vector being a vector of a probability that a pronunciation is predictable as a certain label according to the length of each phoneme of the speech signal. The feature vectors may be softmax columns including posterior probabilities that the speech signals having certain lengths is predictable as certain labels.

In an embodiment, by using the first decoding model, the device 1000 may select one label for each frame from the feature vectors obtained time-sequentially and may obtain label candidates by concatenating the selected labels and representing each phoneme by a corresponding label. The device 1000 may obtain a first string by using posterior probabilities of the label candidates.

In an embodiment, the first decoding model may be a model configured to perform speech recognition on the speech signal by the end-to-end ASR method.

In operation S540, the device 1000 inputs the feature vector to a second decoding model that uses the WFST model generated in operation S510 and obtains a second string from the feature vector, the second string including a word sequence corresponding to a certain named entity and an unrecognized word sequence that is not identified as a named entity. In an embodiment, by using the second decoding model, the device 1000 may calculate a confidence score based on the likelihood, pre-information, and language model for a word for each subword, may select a string having a high confidence score, and may output the second string including the selected string. By using the second decoding model, the device 1000 may calculate a word posterior probability P(W|X) by combining P(s|X), which is a probability that an input X of a label-based feature vector will be predicted as a subword s, with P(W|s), which is a probability that the subword s will be predicted as a word or word sequence W, and may obtain a word or word sequence corresponding to a named entity by searching for a hypothesis in which the word posterior probability P(W|X) is maximized. The device 1000 may be unable to identify a word or word sequence except for named entities learned by the WFST model and may output the word or word sequence in the form of an unrecognized word sequence.

In operation S550, the device 1000 outputs a text corresponding to the speech input by substituting the unrecognized word sequence of the second string with a word sequence included in the first string. In an embodiment, the device 1000 may substitute the unrecognized word sequence included in the second string with a word sequence corresponding to a place of the unrecognized word sequence in the first string.

Figure 6:
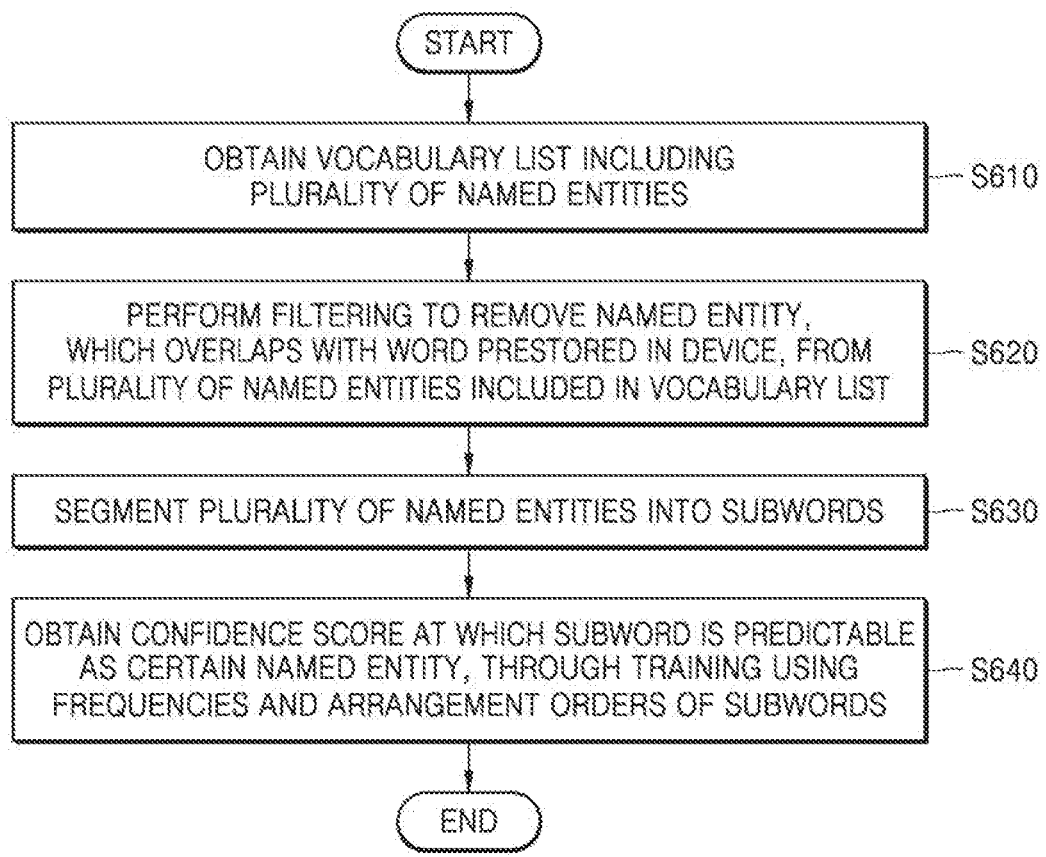
FIG. 6 is a flowchart illustrating an embodiment, in which a device generates a weighted finite state transducer model for a named entity.

FIG. 6 is a flowchart illustrating an embodiment, in which the device 1000 generates a WFST model for named entities. Operations S610 to S640 shown in FIG. 6 are subdivided operations of operation S510 of FIG. 5. After operation S640 shown in FIG. 6, operation S520 of FIG. 5 may be performed.

In operation S610, the device 1000 obtains a vocabulary list including a plurality of named entities. In an embodiment, the device 1000 may obtain the vocabulary list including the plurality of named entities by receiving a user input performed by entering the named entities, by performing reception thereof from an external server, or by crawling a web page, an application executed by the device 1000, or the like. For example, the device 1000 may obtain words or word sequences, which correspond to a plurality of named entities included in an application, from an API of the application that is running. For example, in the case of a music streaming application, the device 1000 may obtain words or word sequences corresponding to named entities such as song titles, artist names, composer names, and the like regarding pieces of music, which are included in a playlist of the user or currently being reproduced. In an embodiment, the device 1000 may store the obtained words or word sequences regarding named entities in the vocabulary list DB 1310 (see FIG. 3) of the memory 1300 (see FIG. 3).

After operation S610 is performed, the device 1000 may perform preprocessing for removing punctuation marks, special characters, special symbols, or the like included in the plurality of named entities and for removing stopwords.

In operation S620, the device 1000 performs filtering to remove named entities, which overlap with words pre-stored in the device 1000, from the plurality of named entities included in the vocabulary list. In an embodiment, the device 1000 may remove the same named entities as words or word sequences pre-stored in the dictionary DB 1320 (see FIG. 3) from the plurality of named entities included in the named-entity vocabulary list DB 1310 of the memory 1300. By performing the filtering, only words corresponding to named entities not included in the dictionary DB 1320 (that is, only out-of-vocabulary (OOV) words) may be stored in the named-entity vocabulary list DB 1310.

Operation S620 (that is, performing the filtering) is not an essential operation. In an embodiment, operation S620 may be omitted. In this case, operation S630 may be performed after operation S610 is performed.

In operation S630, the device 1000 segments the plurality of named entities into subwords. The term "subword" refers to a basic unit, for example, a phoneme or a syllable, which constitutes a word. The device 1000 may segments the plurality of named entities into subwords by using, for example, the HMM. However, the disclosure is not limited thereto. As another example, the device 1000 may tokenize the words or word sequences corresponding to the plurality of named entities into subwords by using the BPE algorithm.

In operation S640, the device 1000 obtains a confidence score at which a subword is predictable as a certain named entity, through training using frequencies and arrangement orders of the subwords. In an embodiment, the device 1000 may generate a statistical model including a probability graph in which each subword is predictable as at least one particular named entity among the plurality of named entities, by using prior probabilities obtained based on the frequencies and arrangement orders of the subwords that are output in operation S630. As used herein, the term "prior probability" refers to a probability statistically pre-calculated based on the frequency, at which a certain subword is used as a certain word or word sequence, and the arrangement order of the certain subword.

The device 1000 may generate a WFST model for named entities by performing training regarding weights through state transition using the prior probabilities of the subwords.

The WFST model generated in operation S640 may be a language model in which a subword is taken as an input and a word or word sequence representing a named entity is taken as an output. The WFST model may output a word or word sequence corresponding to a named entity when a subword is input, based on a probability that the input subword is predictable as a word or word sequence.

Figure 7:
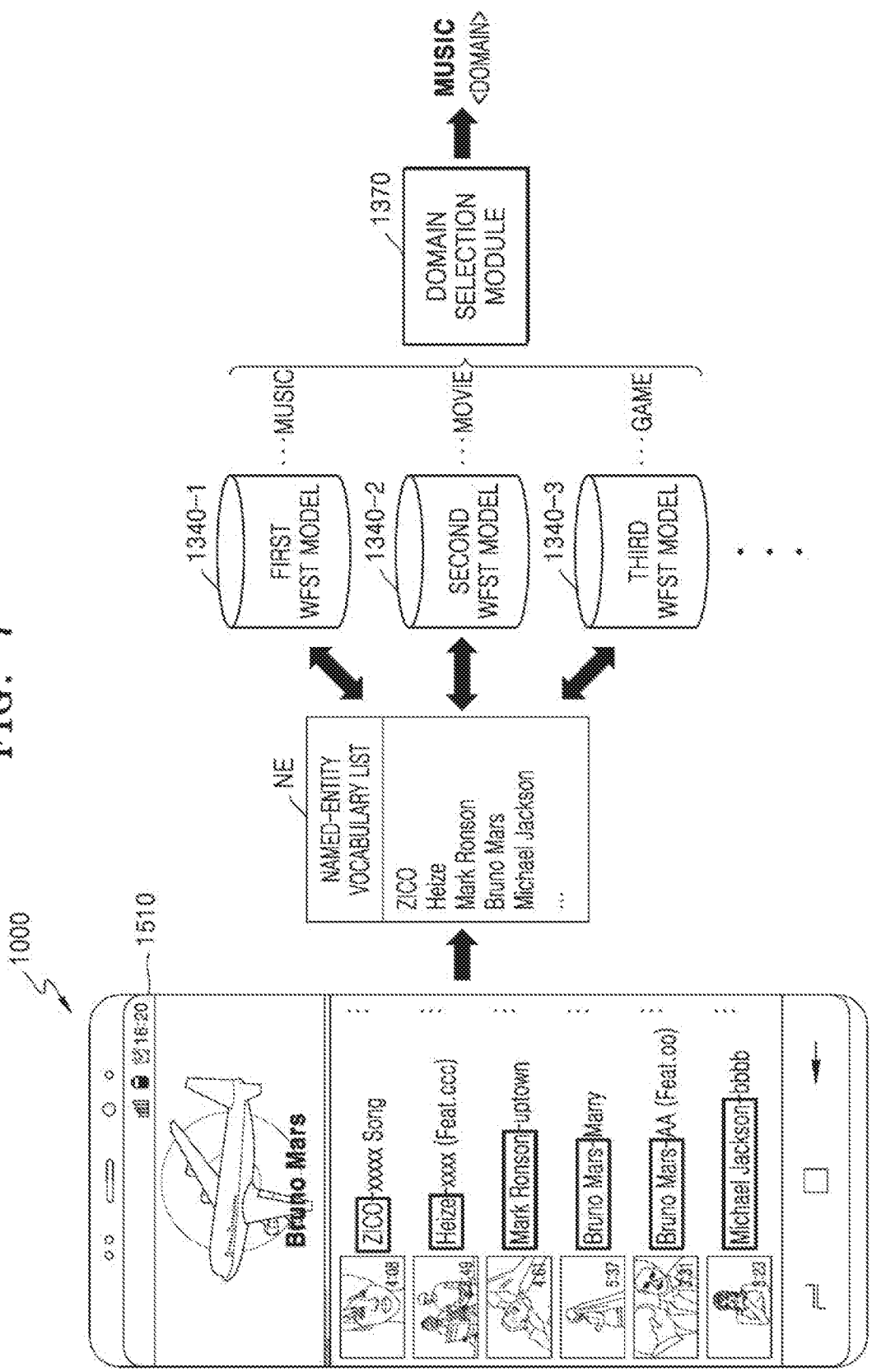
FIG. 7 is a diagram illustrating an embodiment, in which a device automatically selects a domain by using a weighted finite state transducer model.

FIG. 7 is a diagram illustrating an embodiment, in which the device 1000 automatically selects a domain by using WFST models 1340-1, 1340-2, and 1340-3.

Referring to FIG. 7, the device 1000 may identify words or word sequences corresponding to a plurality of named entities from a running application. In the embodiment shown in FIG. 7, the device 1000 may be executing a music streaming application, and an album art of a piece of music, which is being currently reproduced, and a playlist of a user may be displayed on the display 1510. The playlist may include a song title, an artist name, a composer name, an album art, or the like regarding a piece of music that is being currently reproduced or is going to be reproduced. The device 1000 may obtain words or word sequences, which correspond to the plurality of named entities included in the application, from an API of the running application. In an embodiment, the device 1000 may identify a word or word sequence regarding a named entity including at least one of a song title, an artist name, or a composer name, from the music streaming application.

The device 1000 may store at least one word or word sequence, which is identified, in a named-entity vocabulary list NE. In the embodiment, shown in FIG. 7, named entities regarding artist names including ZICO, Heize, Mark Ronson, Bruno Mars, and Michael Jackson may be stored in the named-entity vocabulary list NE.

In an embodiment, the device 1000 may include a domain selection module 1370. The domain selection module 1370 is a module configured to automatically select a domain related to the plurality of named entities identified by the device 1000 by comparing the identified plurality of named entities with named-entity vocabulary lists respectively included in a pre-generated plurality of WFST models. In an embodiment, the domain selection module 1370 may be included in the memory 1300 (see FIG. 3) of the device 1000.

By using instructions or program code related to the domain selection module 1370, the device 1000 may compare named entities included in each of the pre-generated plurality of WFST models 1340-1, 1340-2, and 1340-3 with named entities included in the named-entity vocabulary list NE and may automatically select a domain related to the currently running application from a plurality of domains, based on a result of the comparison. As used herein, the term "domain" refers to a field or a category related to a speech input. For example, the domain may be classified according to the meaning of the speech input, the attribute of the speech input, or a service related to the speech input. The domain may include, for example, one or more domains such as a movie domain, a music domain, a book domain, a game domain, an aviation domain, and a food domain.

The plurality of WFST models 1340-1, 1340-2, and 1340-3 are models trained by using a plurality of named entities that are classified according to the plurality of domains different from each other. For example, a first WFST model 1340-1 is a model trained by using a plurality of named entities regarding music, a second WFST model 1340-2 is a model trained by using a plurality of named entities regarding movies, and a third WFST model 1340-3 is a model trained by using a plurality of named entities regarding games. Although FIG. 7 illustrates a total of three WFST models as the plurality of WFST models 1340-1, 1340-2, and 1340-3, the disclosure is not limited thereto.

By using the domain selection model 1370, the device 1000 may compare the named entities included in the named-entity vocabulary list NE with the named entities included in the first WFST model 1340-1 and may count the number of repeated named entities. Likewise, by using the domain selection model 1370, the device 1000 may compare the named entities included in the named-entity vocabulary list NE with the named entities included in each of the second WFST model 1340-2 and the third WFST model 1340-3 and may count the number of repeated named entities for each of the second and third WFST models 1340-2 and 1340-3.

The device 1000 may select a domain based on the WFST model having a maximum counted number of repeated named entities. In the embodiment, shown in FIG. 7, because the named-entity vocabulary list NE includes the plurality of named entities (for example, artist names in the playlist of the music streaming application) related to a music domain, the WFST model having a maximum counted number of repeated named entities may be the first WFST model 1340-1 that is trained by using the plurality of named entities corresponding to the music domain. The device 1000 may determine that "music", which is a domain learned by the first WFST model 1340-1, is a domain related to the currently running application.

When a speech input related to the running application is received from a user, the device 1000 may interpret the speech input based on the determined domain and may perform an operation or a function according to a result of the interpretation. For example, when a speech input "Play a song by Bruno Mars" is received, the device 1000 may interpret the speech input from the user based on "music" that is the determined domain, and may reproduce a song by Bruno Mars among a plurality of songs included in the playlist according to the result of the interpretation.

Figure 8:
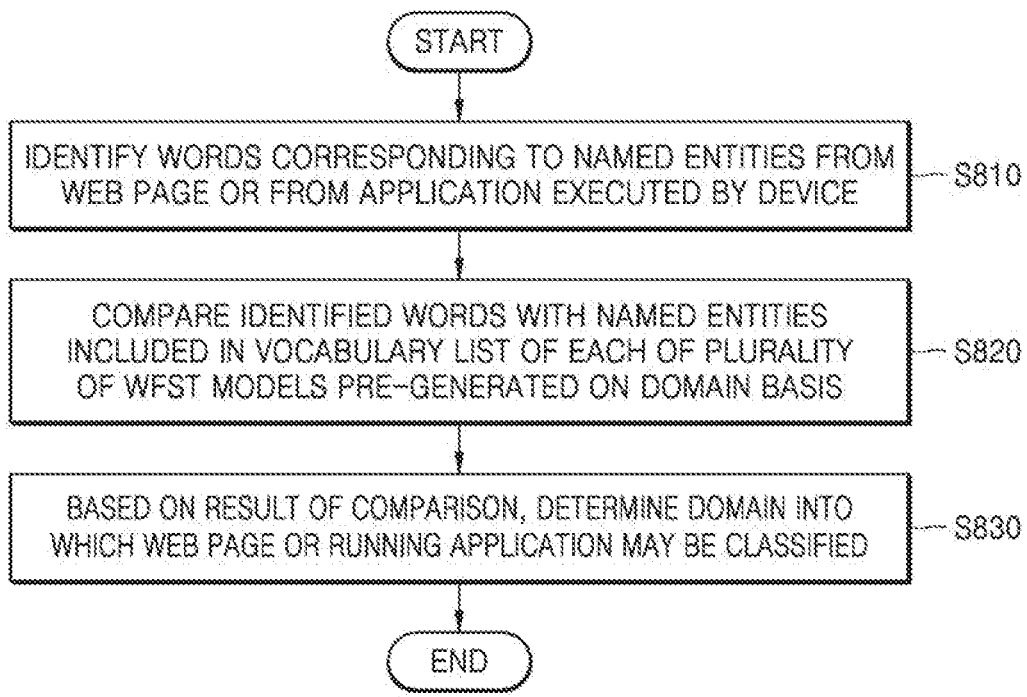
FIG. 8 is a flowchart illustrating an embodiment, in which a device automatically selects a domain by using a weighted finite state transducer model.

FIG. 8 is a flowchart illustrating an embodiment, in which the device 1000 automatically selects a domain by using a WFST model.

In operation S810, the device 1000 identifies words corresponding to named entities from a running application or a web page. In an embodiment, the device 1000 may obtain words or word sequences, which correspond to a plurality of named entities included in the application, from an API of the application executed by the device 1000. In another embodiment, the device 1000 may obtain words or word sequences regarding a plurality of named entities, which are included in the web page, by crawling the web page currently accessed by the device 1000.

The device 1000 may store the obtained words or word sequences corresponding to the plurality of named entities in the named-entity vocabulary list DB 1310.

In operation S820, the device 1000 compares the identified words with named entities included in respective vocabulary lists of a plurality of WFST models pre-generated for respective domains. The plurality of WFST models are models trained by using a plurality of named entities classified according to a plurality of domains different from each other. Each of the plurality of WFST models may include a vocabulary list including the plurality of named entities classified into the plurality of domains different from each other. In an embodiment, the device 1000 may compare the words, which correspond to the named entities identified in operation S810, with the plurality of named entities in the vocabulary list included in each of the plurality of WFST models, may identify named entities repeated as a result of the comparison, and may count the number of identified named entities.

In operation S830, the device 1000 determines, based on the result of the comparison, a domain into which the running application or the web page may be classified. In an embodiment, the device 1000 may determine the domain, based on a WFST model, in which the number of repeated named entities counted in operation S820 is a maximum, among the plurality of WFST models. For example, when the WFST model having a maximum counted number of named entities is a model including a named-entity vocabulary list regarding a "music" domain, the device 1000 may determine that the domain related to the running application or the web page is "music".

According to the related art, when a speech input is received from a user, to automatically select a domain related to the received speech input, a pattern sentence according to a named entity needs to be learned, and the domain needs to be selected based on the learned pattern sentence. In the pattern sentence according to the named entity, because there is a high probability that a certain speech command will be combined with a certain named entity, for example, as in "Show me+<named entity>" or "Let me hear+<named entity>", there are issues in that training regarding individual pattern sentences requires a large amount of data calculation and causes a low learning rate. In addition, when there are no specialized patterns regarding domains, there is an issue in that the domain related to the speech input is not able to be accurately selected.

In the embodiments, shown in FIGS. 7 and 8, because the domain is selected by identifying the plurality of named entities from the application, which is being executed by the device 1000, or the web page, which is being accessed by the device 1000, and by comparing the identified named entities with the named entities included in the pre-generated plurality of WFST models 1340-1, 1340-2, and 1340-3, there is an advantage of a high processing speed as compared with techniques according to the related art. In addition, in the embodiments, because the identified named entities are compared with the named entities included in the plurality of WFST models 1340-1, 1340-2, and 1340-3, the accuracy of domain selection may be improved due to no need to consider pattern sentences.

Figure 9:
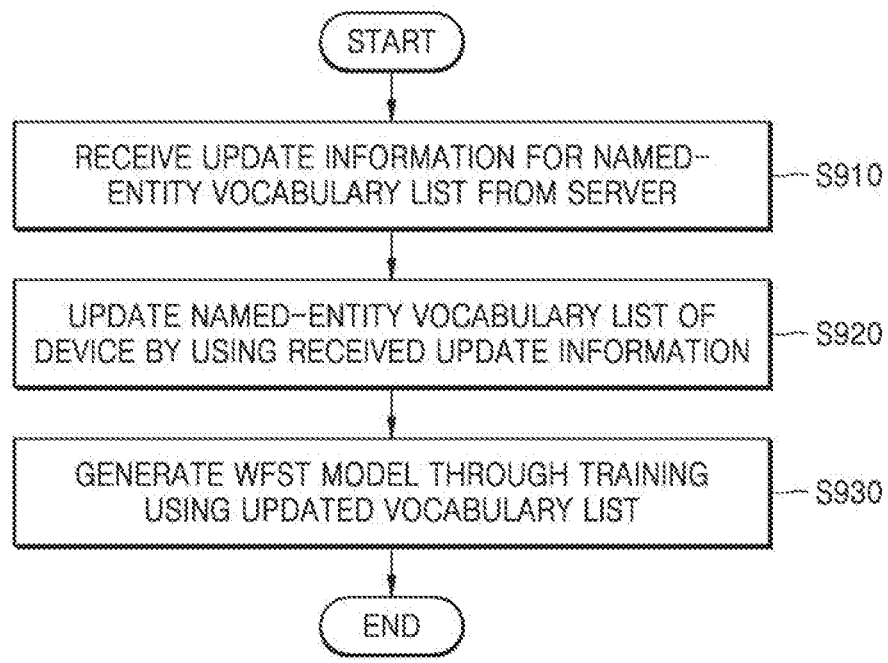
FIG. 9 is a flowchart illustrating an embodiment, in which a device generates a weighted finite state transducer model for a named entity by using information received from a server.

FIG. 9 is a flowchart illustrating an embodiment, in which the device 1000 generates a WFST model for named entities by using information received from the server 2000.

In operation S910, the device 1000 receives update information for a named-entity vocabulary list from the server 2000. The "update information for the named-entity vocabulary list" may include, for example, at least one of: at least one new named entity that is newly added to the named-entity vocabulary list DB 2330 (see FIG. 4) stored in the server 2000; domain information for classifying each of the at least one new named entity; application information related to the new named entity; deletion information for a pre-stored named entity; or modification information for the pre-stored named entity. In an embodiment, the device 1000 may receive update information for the named-entity vocabulary list DB 2330 from the server 2000 according to a preset cycle. The preset cycle may be, for example, 6 hours, one day, one week, or one month, but is not limited thereto.

In another embodiment, the device 1000 may receive the update information for the named-entity vocabulary list DB 2330 from the server 2000 every time when the addition of new named-entity vocabularies, the deletion, or the modification is performed on the named-entity vocabulary list DB 2330.

In operation S920, the named-entity vocabulary list of the device 1000 is updated by using the received update information. By using the update information received from the server 2000, the device 1000 may add a new named entity to the named-entity vocabulary list DB 1310 pre-stored in the memory 1300 (see FIG. 3), may delete a pre-stored named entity, or may modify the pre-stored named entity.

In operation S930, the device 1000 generates the WFST model through training using the updated vocabulary list. In an embodiment, the device 1000 may segment at least one word or word sequence included in the updated named-entity vocabulary list DB 1310 into subwords, and by using prior probability information of the segmented subwords (for example, frequencies and arrangement orders of the subwords), may perform training regarding a weight for a posterior probability that each subword is predictable as a certain word or word sequence, thereby generating the WFST model. Because a particular method, performed by the device 1000, of generating a WFST model by using words or word sequences regarding a plurality of named entities is the same as the method described with reference to FIGS. 1 and 3, repeated descriptions thereof will be omitted.

In an embodiment, the device 1000 may update the pre-generated WFST model by using the update information for the named-entity vocabulary list DB 1310.

In the embodiment, shown in FIG. 9, the device 1000 may receive the update information for named entities from the server 2000 and may generate or update the WFST model for named entities by using the received update information for named entities, thereby maintaining the named entities up to date. Therefore, the device 1000 according to an embodiment may improve the accuracy in recognition of a speech input from a user, the speech input including an utterance about the latest named entity.

Figure 10:
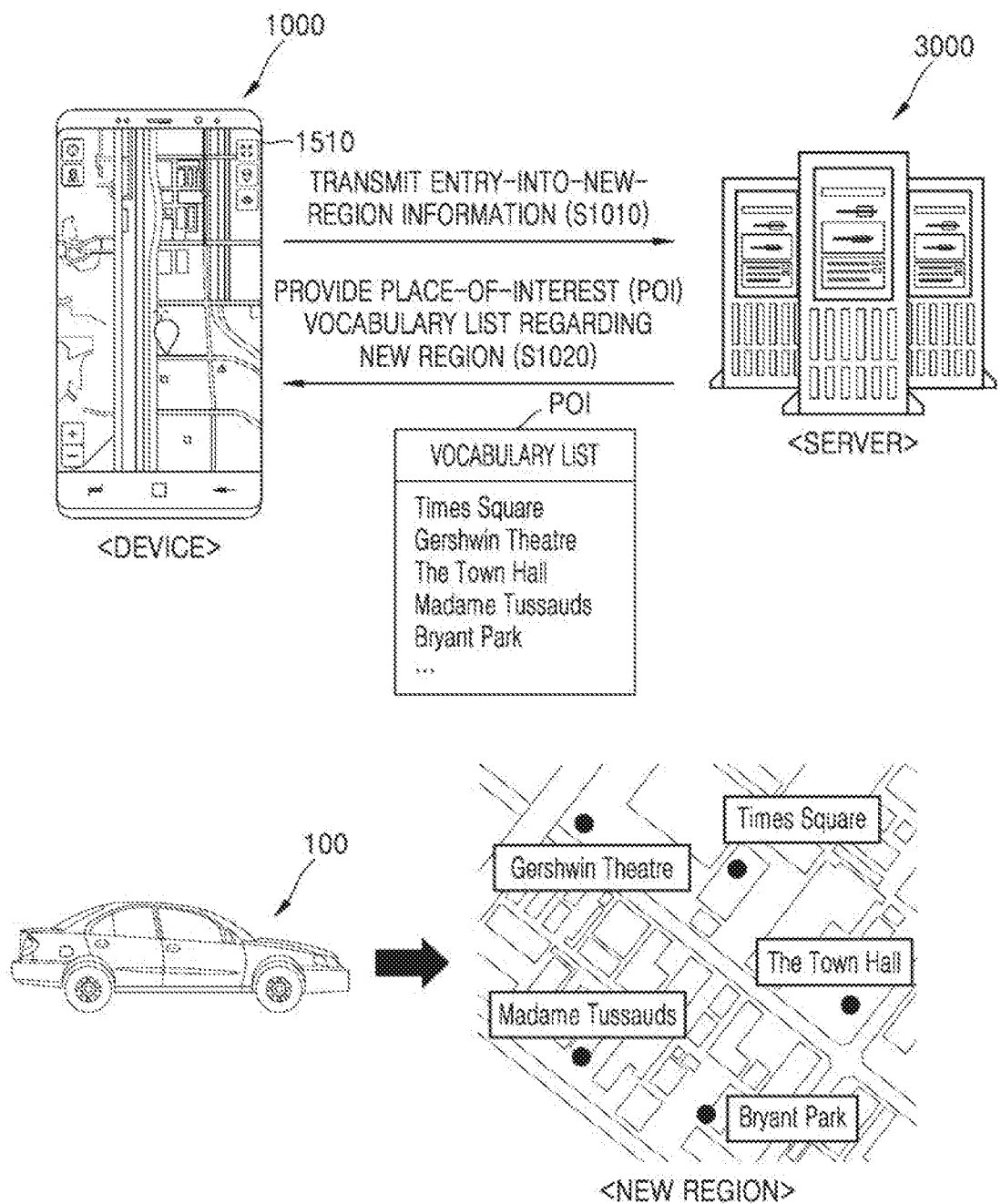
FIG. 10 is a conceptual diagram illustrating an embodiment, in which, when a device enters a new region, the device generates a weighted finite state transducer model by using a point-of-interest vocabulary list regarding the new region.

FIG. 10 is a conceptual diagram illustrating an embodiment, in which, when the device 1000 enters a new region, the device 1000 generates a WFST model by using a POI vocabulary list regarding the new region.

Referring to FIG. 10, a user may execute a navigation application via the device 1000 while using a vehicle 100. In an embodiment, the device 1000 may include a position sensor, for example, a GPS sensor. The device 1000 may obtain information about a current position of the device 1000, which is moving along with the vehicle 100, by using the GPS sensor.

When the vehicle 100 enters the new region, the device 1000 transmits entry-into-new-region information indicating the entry of the device 1000 into the new region to a server 3000 of an application service provider by using the GPS sensor (S1010). The "entry-into-new-region information" may include, for example, at least one of position information of the new region, a time point of entry into the new region, or position information regarding a region to enter during a preset time period. In the embodiment, shown in FIG. 10, the "application service provider" may be a navigation application service provider.

The "new region" may refer to a region which is stored in the server 3000 of the application service provider although not stored in a position-based application installed in the device 1000 and executed by the device 1000. Here, the "position-based application" refers to an application, such as a navigation application or a map application, which provides information or performs a particular operation or function based on position information of the device 1000. The navigation application executed by the device 1000 is not able to include all information about places such as place names, attractions, or tourist spots for all regions, due to a limit in installation capacity within the device 1000. The navigation application installed in the device 1000 may store only place information for a minimum number of regions, and place information for new regions may be stored in only the server 3000.

When receiving the entry-into-new-region information from the device 1000, the server 3000 of the application service provider provides a POI vocabulary list POI for the new region to the device 1000 (S1020). The POI vocabulary list POI may include, for example, named entities regarding at least one of place names, attractions, tourist spots, or famous restaurants of the new region. In the embodiment, shown in FIG. 10, the POI vocabulary list POI may include Times Square, Gershwin Theatre, The Town Hall, Madame Tussauds, and Bryant Park as examples of the named entities regarding the place names, attractions, or tourist spots of the new region.

The device 1000 may generate a WFST model through training using the named entities which are included in the POI vocabulary list POI received from the server 3000 of the application service provider. In an embodiment, the device 1000 may segment words or word sequences, which correspond to the named entities included in the POI vocabulary list POI, into units of subwords, and by using prior probability information of the segmented subwords (for example, frequencies and arrangement orders of the subwords), may perform training regarding a weight for a posterior probability that each subword is predictable as a certain word or word sequence, thereby generating the WFST model. Because a particular method, performed by the device 1000, of generating the WFST model by using a plurality of named entities is the same as the method described with reference to FIGS. 1 and 3, repeated descriptions thereof will be omitted.

Figure 11:
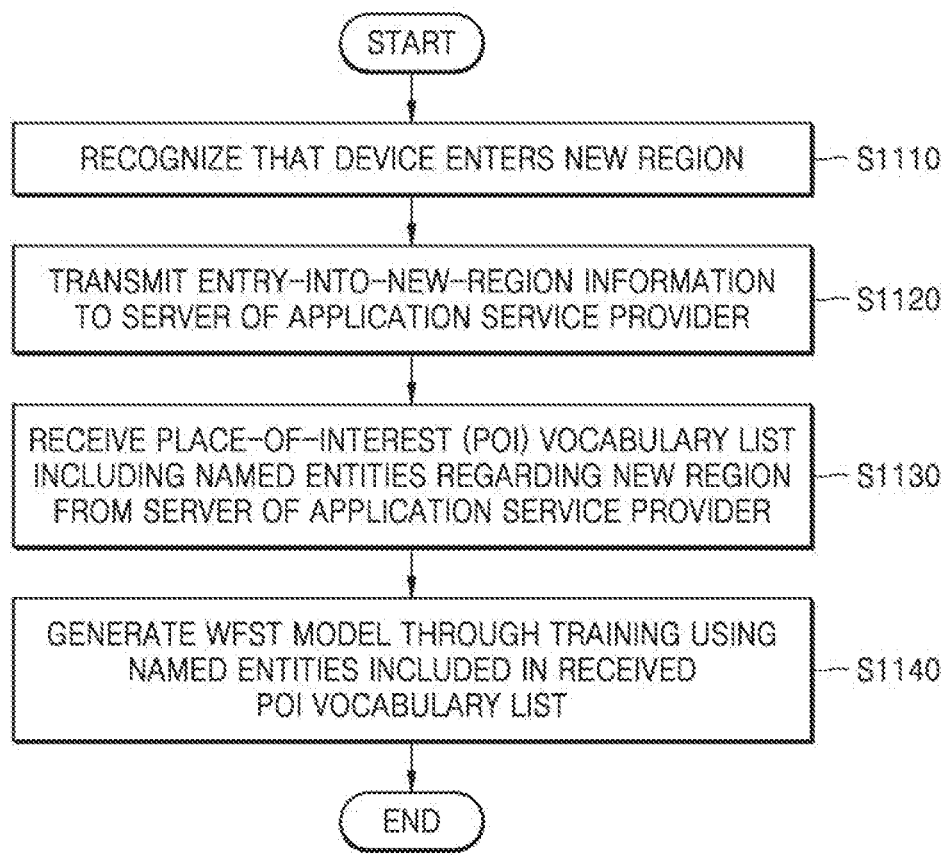
FIG. 11 is a conceptual diagram illustrating an embodiment, in which, when a device enters a new region, the device generates a weighted finite state transducer model by using a point-of-interest vocabulary list regarding the new region.

FIG. 11 is a conceptual diagram illustrating an embodiment, in which, when the device 1000 enters a new region, the device 1000 generates a WFST model by using a POI vocabulary list regarding the new region.

In operation S1110, the device 1000 recognizes that the device 1000 enters the new region. In an embodiment, the device 1000 may include a position sensor such as a GPS sensor. The device 1000 may recognizes that the device 1000 has entered the new region by obtaining position information of the device 1000 by using the position sensor. The "new region" may refer to a region which is stored in a server of an application service provider although not stored in a position-based application installed in the device 1000 and executed by the device 1000.

In operation S1120, the device 1000 transmits entry-into-new-region information to the server of the application service provider. In an embodiment, the device 1000 may transmit the entry-into-new-region information to the server of the application service provider by using the communication interface 1400 (see FIG. 3). The "entry-into-new-region information" may include, for example, at least one of position information of the new region, a time point of entry into the new region, or position information regarding a region to enter during a preset time period.

In operation S1130, the device 1000 receives the POI vocabulary list including named entities regarding the new region from the server of the application service provider. The POI vocabulary list may include, for example, named entities regarding at least one of place names, attractions, tourist spots, or famous restaurants of the new region.

In operation S1140, the device 1000 generates a WFST model through training using the named entities which are included in the POI vocabulary list received from the server of the application service provider. In an embodiment, the device 1000 may segment words or word sequences, which correspond to the named entities included in the POI vocabulary list, into units of subwords and, by using prior probability information of the segmented subwords (for example, frequencies and arrangement orders of the subwords), may perform training regarding a weight for a posterior probability that each subword is predictable as a certain word or word sequence, thereby generating the WFST model.

Figure 12:
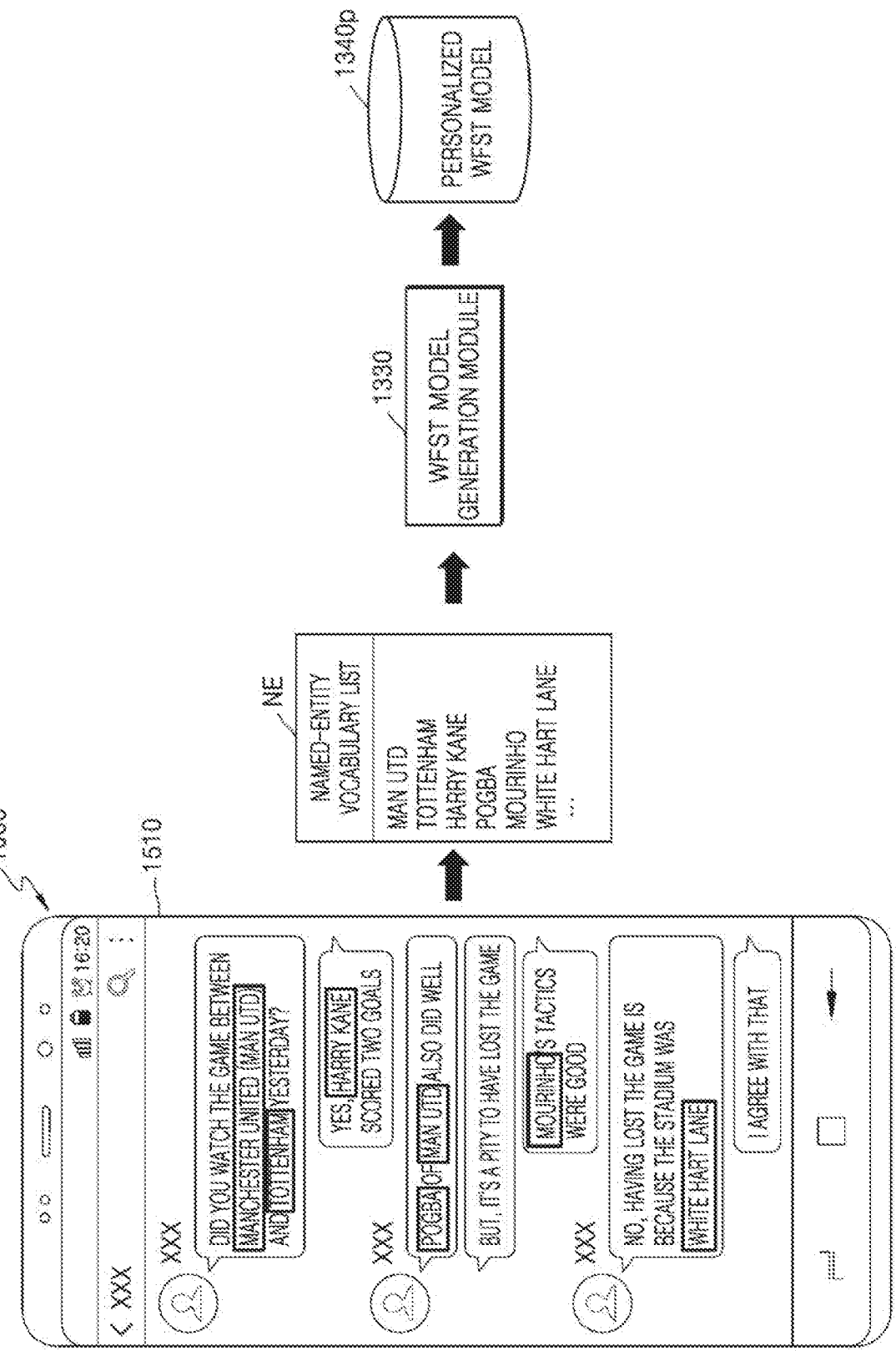
FIG. 12 is a diagram illustrating an embodiment, in which a device generates a personalized weighted finite state transducer model by using a named entity reflecting personal characteristics of a user.

FIG. 12 is a diagram illustrating an embodiment, in which the device 1000 generates a personalized WFST model (or a customized WFST model) by using a named entity reflecting personal characteristics of a user.

Referring to FIG. 12, the device 1000 may execute a messenger application, and a dialog box of the messenger application may be displayed on the display 1510. In an embodiment, the device 1000 may obtain a personalized (or customized) named-entity vocabulary list NE, which includes a plurality of named entities reflecting personal characteristics of a user, by analyzing log data of the messenger application. The "personal characteristics" may include personal information such as the age, gender, school, and workplace of the user, relationships such as friends or fellow-workers of the user, fields of interest such as games, sports, music, movies, or the like, in which the user is interested. In the embodiment, shown in FIG. 12, the device 1000 may identify, from the log data of the messenger application, soccer-related named entities such as Manchester United (Man Utd), Tottenham, Harry Kane, Pogba, Mourinho, and White Hart Lane and may obtain the personalized named-entity vocabulary list NE including the identified soccer-related named entities.

The device 1000 may generate a personalized WFST model 1340*p* by using instructions or program code related to the WFST model generation module 1330. In an embodiment, the device 1000 may segment a plurality of named entities included in the personalized named-entity vocabulary list NE into subwords, and by using prior probability information of the segmented subwords (for example, frequencies and arrangement orders of the subwords), may perform training regarding a weight for a posterior probability that each subword is predictable as a certain word or word sequence, thereby generating the personalized WFST model 1340*p*.

Although FIG. 12 illustrates that the device 1000 obtains the personalized named-entity vocabulary list NE by using the log data of the messenger application, the disclosure is not limited thereto. In an embodiment, the device 1000 may obtain the personalized named-entity vocabulary list NE, which includes the plurality of named entities reflecting the personal characteristics of the user, from at least one of a frequently executed application, the messenger application, and a search term history in a content streaming application.

A program executed by the device 1000 described herein may be implemented by a hardware component, a software component, and/or a combination of a hardware component and a software component. The program may be executed by any system capable of executing computer-readable instructions.

Software may include a computer program, code, an instruction, or a combination of one or more thereof and may configure a processing device to be operated as intended or may independently or collectively command the processing device.

The software may be implemented by a computer program including instructions stored in computer-readable storage media. Computer-readable storage media may include, for example, magnetic storage media (for example, ROM, RAM, a floppy disk, a hard disk, and the like), optical reading media (for example, CD-ROM and a digital versatile disc (DVD)), and the like. The computer-readable storage media may be distributed in computer systems connected to each other via a network, and thus, computer-readable code may be stored therein and executed in a distributed manner. The media may be able to be read by a computer, may be stored in a memory, and may be executed by a processor.

The computer-readable storage media may be provided in the form of non-transitory storage media. Here, the term "non-transitory" merely means that storage media do not include signals and are tangible, whether data is semi-permanently or temporarily stored in the storage media.

In addition, the program according to the embodiments disclosed herein may be provided while included in a computer program product. The computer program product may be traded as merchandise between a seller and a purchaser.

The computer program product may include a software program and a computer-readable storage medium in which the software program is stored. For example, the computer program product may include merchandise (for example, a downloadable application) in the form of a software program electronically distributed through a manufacturer of a device or through an electronic market (for example, Google Play Store, or App Store). For electronic distribution, at least a portion of the software program may be stored in a storage medium or be temporarily generated. In this case, the storage medium may be a storage medium of a server of a manufacturer, a server of an electronic market, or a relay server temporarily storing the software program.

In a system including a server and a device, the computer program product may include a storage medium of the server or a storage medium of the device. Alternatively, when there is a third device (for example, a smart phone) communicatively connected to the server or the device, the computer program product may include a storage medium of the third device. Alternatively, the computer program product may include the software program itself, which is transmitted from the server to the device or the third device or transmitted from the third device to the device.

In this case, one of the server, the device, and the third device may execute the computer program product, thereby performing the method according to the disclosed embodiments. Alternatively, two or more of the server, the device, and the third device may execute the computer program product, thereby dispersively performing the method according to the disclosed embodiments.

For example, the server may execute the computer program product stored in the server, thereby controlling the device, which is communicatively connected to the server, to perform the method according to the disclosed embodiments.

As another example, the third device may execute the computer program product, thereby controlling the device, which is communicatively connected to the third device, to perform the method according to the disclosed embodiments.

When the third device executes the computer program product, the third device may download the computer program product from the server and execute the downloaded computer program product. Alternatively, the third device may perform the method according to the disclosed embodiments by executing the computer program product provided in a pre-loaded state.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of performing speech recognition by a device, the method comprising:
  by using a vocabulary list comprising a plurality of named entities, generating a weighted finite state transducer model by performing training regarding a probability that a subword extracted from each of the plurality of named entities is predictable as a word or word sequence representing a named entity;
  receiving a speech input from a user;
  by using a first artificial intelligence (AI) decoding model, obtaining a feature vector indicating a probability of predicting a subword from the received speech input, and obtaining a first string comprising a plurality of predicted strings based on the feature vector;
  inputting the feature vector to a second AI decoding model that uses the weighted finite state transducer model that is trained to predict the word or word sequence representing the named entity, from a trained subword extracted from a plurality of trained named entities;
  by using the second AI decoding model, obtaining a second string based on the feature vector, the second string comprising a recognized word sequence that corresponds to at least one of a plurality of predetermined named entities, and an unrecognized word sequence that does not correspond to any one of the plurality of predetermined named entities; and
  outputting a text corresponding to the received speech input by substituting the unrecognized word sequence of the second string with a word sequence included in the first string.

2. The method of claim 1, wherein the generating of the weighted finite state transducer model comprises:
  obtaining the vocabulary list comprising the plurality of named entities;
  segmenting a word or a string constituting the plurality of named entities into trained subwords that are in units of phonemes or syllables; and
  obtaining a confidence score comprising a posterior probability of predicting one of the plurality of named entities from the trained subwords, through state transition using frequencies of the trained subwords and arrangement orders of the trained subwords.

3. The method of claim 2, wherein the weighted finite state transducer model comprises a lexicon finite state transducer and a grammar finite state transducer,
  wherein the lexicon finite state transducer comprises mapping information which is a probability of predicting a first word or a first word sequence from each of the trained subwords, and
  wherein the grammar finite state transducer comprises weight information for, when the first word or the first word sequence is input, predicting a second word sequence capable of being arranged after the first word or the first word sequence.

4. The method of claim 1, wherein the first AI decoding model is an end-to-end automatic speech recognition (ASR) model.

5. The method of claim 1, wherein the generating of the weighted finite state transducer model by:
  classifying the plurality of named entities according to a plurality of domains different from each other; and
  generating a plurality of weighted finite state transducer models for the respective plurality of domains by using the classified plurality of named entities.

6. The method of claim 5, further comprising:
  identifying words corresponding to named entities included in an application executed by the device or a web page provided via the device; and
  determining a domain into which the application or the web page, by comparing the identified words with a plurality of named entities which are comprised in a vocabulary list of each of the plurality of weighted finite state transducer models generated for the respective plurality of domains.

7. The method of claim 1, further comprising:
receiving update information for a vocabulary list from a server, the update information comprising at least one of addition of a new named entity, deletion of the named entity, and modification of the named entity; and
updating the vocabulary list by using the update information,
wherein the generating of the weighted finite state transducer model comprises generating the weighted finite state transducer model by using the updated vocabulary list.

8. The method of claim 1, further comprising:
recognizing that the device enters a new region, by obtaining position information of the device;
transmitting entry-into-new-region information of the device to a server of an application service provider; and
receiving a point-of-interest (POI) vocabulary list from the server of the application service provider, the POI vocabulary list comprising named entities regarding at least one of place names, attractions, tourist spots, or famous restaurants of the new region,
wherein the generating of the weighted finite state transducer model comprises generating the weighted finite state transducer model by training the weighted finite state transducer model using the plurality of named entities included in the received POI vocabulary list.

9. The method of claim 1, wherein the generating of the weighted finite state transducer model comprises generating the weighted finite state transducer model by training the weighted finite state transducer model using the plurality of named entities that reflect characteristics of the user that are obtained from at least one of an application executed by the device more than a predetermined frequency, log data of a messenger application, and a search term history in a content streaming application.

10. A device for performing speech recognition, the device comprising:
a speech inputter configured to receive a speech input from a user;
at least one memory configured to store one or more computer-readable instructions; and
at least one processor configured to execute the one or more computer-readable instructions to:
by using a vocabulary list comprising a plurality of named entities, generate a weighted finite state transducer model by performing training regarding a probability that a subword extracted from each of the plurality of named entities is predictable as a word or word sequence representing a named entity;
receive the speech input from the speech inputter;
by using a first artificial intelligence (AI) decoding model, obtain a feature vector indicating a probability of predicting a subword from the received speech input, and obtain a first string comprising a plurality of predicted strings based on the probability of the feature vector;
input the feature vector to a second AI decoding model that uses the weighted finite state transducer model that is trained to predict the word or word sequence representing the named entity, from a trained subword extracted from a plurality of named entities;
by using the second AI decoding model, obtain a second string based on the feature vector, the second string comprising a recognized word sequence that corresponds to at least one of a plurality of predetermined named entities, and an unrecognized word sequence that does not correspond to any one of the plurality of predetermined named entities; and
obtain a text corresponding to the received speech input by substituting the unrecognized word sequence of the second string with a word sequence included in the first string.

11. The device of claim 10, wherein the at least one processor is further configured to execute the one or more computer-readable instructions to generate the weighted finite state transducer model by:
obtaining the vocabulary list comprising the plurality of named entities;
segmenting a word or a string constituting the plurality of named entities into trained subwords that are in units of phonemes or syllables; and
obtaining a confidence score comprising a posterior probability of predicting one of the plurality of named entities from the trained subwords, through state transition using frequencies of the trained subwords and arrangement orders of the trained subwords.

12. The device of claim 11, wherein the at least one processor is further configured to execute the one or more computer-readable instructions to generate the weighted finite state transducer model by:
performing filtering to remove the named entity from the plurality of named entities, based the named entity overlapping with a word pre-stored in the at least one memory of the device.

13. The device of claim 11, wherein the weighted finite state transducer model comprises a lexicon finite state transducer and a grammar finite state transducer,
wherein the lexicon finite state transducer comprises mapping information which is a probability of predicting a first word or a first word sequence from each of the trained subwords, and
wherein the grammar finite state transducer comprises weight information for, when the first word or the first word sequence is input, predicting a second word sequence capable of being arranged after the first word or the first word sequence.

14. The device of claim 10, wherein the first AI decoding model is an end-to-end automatic speech recognition (ASR) model.

15. The device of claim 10, wherein the at least one processor is further configured to execute the one or more computer-readable instructions to:
classifying the plurality of named entities according to a plurality of domains different from each other; and
generating a plurality of weighted finite state transducer models for the respective plurality of domains by using the classified plurality of named entities.

16. The device of claim 15, wherein the at least one processor is further configured to execute the one or more computer-readable instructions to:
identify words corresponding to named entities included in an application executed by the device or a web page accessed by the device; and
determine a domain into which the application or the web page, by comparing the identified words with the plurality of predetermined named entities which are comprised in a vocabulary list of each of the plurality of weighted finite state transducer models generated for the respective plurality of domains.

17. The device of claim 10, further comprising a communication interface configured to transmit data to and receive data from a server, wherein the at least one processor is further configured to execute the one or more computer-readable instructions to:
  receive update information for a vocabulary list from the server by using the communication interface, the update information comprising at least one of addition of a new named entity, deletion of the named entity, and modification of the named entity;
  update the vocabulary list by using the update information; and
  generate the weighted finite state transducer model by training the weighted finite state transducer model using the updated vocabulary list.

18. The device of claim 10, further comprising:
a position sensor configured to obtain position information of the device; and
a communication interface configured to transmit data to and receive data from a speech assistant server or an external server,
wherein the at least one processor is further configured to execute the one or more computer-readable instructions to:
  recognize that the device enters a new region, based on the position information of the device;
  in response to recognizing that the device enters the new region, receive a point-of-interest (POI) vocabulary list from an application service provider sever through the communication interface, the POI vocabulary list comprising named entities regarding at least one of place names, attractions, tourist spots, or famous restaurants of the new region; and
  generate the weighted finite state transducer model by training the weighted finite state transducer model using the plurality of named entities included in the received POI vocabulary list.

19. The device of claim 10, wherein the at least one processor is further configured to execute the one or more computer-readable instructions to generate the weighted finite state transducer model by training the weighted finite state transducer model using the plurality of named entities that reflect characteristics of the user that are obtained from at least one of an application executed by the device more than a predetermined frequency, log data of a messenger application, and a search term history in a content streaming application.

20. A non-transitory computer-readable storage medium storing a program that is executable by a computer to perform the method of claim 1.

* * * * *